(12) United States Patent
Butler et al.

(10) Patent No.: US 12,456,016 B2
(45) Date of Patent: *Oct. 28, 2025

(54) DISCOVERING A SEMANTIC MEANING OF DATA FIELDS FROM PROFILE DATA OF THE DATA FIELDS

(71) Applicant: Ab Initio Technology LLC, Lexington, MA (US)

(72) Inventors: Christopher Thurston Butler, Ascot (GB); Timothy Spencer Bush, North Leigh (GB)

(73) Assignee: Ab Initio Technology LLC, Lexington, MA (US)

( * ) Notice: Subject to any disclaimer, the term of this patent is extended or adjusted under 35 U.S.C. 154(b) by 245 days.

This patent is subject to a terminal disclaimer.

(21) Appl. No.: 18/201,545

(22) Filed: May 24, 2023

(65) Prior Publication Data

US 2023/0409835 A1     Dec. 21, 2023

Related U.S. Application Data

(63) Continuation of application No. 16/794,361, filed on Feb. 19, 2020, now Pat. No. 11,704,494.

(Continued)

(51) Int. Cl.
    *G06F 40/30*      (2020.01)
    *G06F 16/908*     (2019.01)
    (Continued)

(52) U.S. Cl.
    CPC ............ *G06F 40/30* (2020.01); *G06F 16/908* (2019.01); *G06F 16/93* (2019.01); *G06N 20/00* (2019.01)

(58) Field of Classification Search
    CPC ...... A61P 29/00; G06F 16/211; G06F 16/215; G06F 16/2365; G06F 16/24534;
(Continued)

(56) References Cited

U.S. PATENT DOCUMENTS

| | | |
|---|---|---|
| 7,587,636 B2 | 9/2009 | Tillman et al. |
| 7,756,873 B2 | 7/2010 | Gould et al. |

(Continued)

FOREIGN PATENT DOCUMENTS

| | | |
|---|---|---|
| CN | 101802776 | 8/2010 |
| CN | 106528874 | 3/2017 |

(Continued)

OTHER PUBLICATIONS

Office Action in Chinese Appln. No. 202080039989.0, mailed on Jan. 24, 2025, 4 pages (with English Translation).

(Continued)

*Primary Examiner* — Gerald Gauthier
(74) *Attorney, Agent, or Firm* — Fish & Richardson P.C.

(57) ABSTRACT

A data processing system for discovering a semantic meaning of a field included in one or more data sets is configured to identify a field included in one or more data sets, with the field having an identifier. For that field, the system profiles data values of the field to generate a data profile, accesses a plurality of label proposal tests, and generates a set of label proposals by applying the plurality of label proposal tests to the data profile. The system determines a similarity among the label proposals and selects a classification. The system identifies one of the label proposals as identifying the semantic meaning. The system stores the identifier of the field with the identified one of the label proposals that identifies the semantic meaning.

36 Claims, 21 Drawing Sheets

Related U.S. Application Data

(60) Provisional application No. 62/855,233, filed on May 31, 2019.

(51) Int. Cl.
 *G06F 16/93* (2019.01)
 *G06N 20/00* (2019.01)

(58) Field of Classification Search
 CPC ............... G06F 16/2457; G06F 16/328; G06F 16/3337; G06F 16/5846; G06F 16/81; G06F 16/908; G06F 16/93; G06F 16/951; G06F 18/24; G06F 40/18; G06F 40/289; G06F 40/30; G06F 8/65; G06F 16/16; G06F 16/22; G06F 16/2228; G06F 16/2272; G06F 16/24575; G06F 16/2465; G06F 16/285; G06F 16/288; G06F 17/18; G06F 40/117; G06N 3/044; G06N 5/022; G06N 5/025; G06N 20/00; G06N 3/045; G06Q 30/0251; G06Q 30/0201; H03M 7/6005; H04L 41/046; B65D 51/2878
 USPC ................................ 704/9; 706/46; 707/690
 See application file for complete search history.

(56) References Cited

U.S. PATENT DOCUMENTS

| | | | |
|---|---|---|---|
| 7,849,075 B2 | 12/2010 | Gould et al. | |
| 8,082,243 B2 | 12/2011 | Gorelik et al. | |
| 8,379,939 B1 | 2/2013 | Bourdev et al. | |
| 8,583,747 B2 | 11/2013 | Buchheit et al. | |
| 8,732,213 B2 | 5/2014 | Sowell et al. | |
| 8,868,580 B2 | 10/2014 | Gould et al. | |
| 9,792,351 B2* | 10/2017 | Hernandez-Sherrington | G06F 16/288 |
| 10,198,460 B2* | 2/2019 | Gorelik | G06F 16/2465 |
| 10,409,802 B2* | 9/2019 | Spitz | G06F 16/2365 |
| 10,459,954 B1* | 10/2019 | Walters | G06F 18/24 |
| 10,489,360 B2 | 11/2019 | Procops et al. | |
| 10,552,443 B1* | 2/2020 | Wu | G06F 16/2228 |
| 10,565,177 B2* | 2/2020 | Gausman | G06F 16/2272 |
| 10,664,862 B1* | 5/2020 | Szulczewski | G06Q 30/0251 |
| 11,704,494 B2* | 7/2023 | Butler | G06F 16/93 704/9 |
| 11,886,399 B2 | 1/2024 | Joyce et al. | |
| 12,141,107 B2 | 11/2024 | Joyce et al. | |
| 12,242,442 B2 | 3/2025 | Joyce et al. | |
| 12,242,443 B2 | 3/2025 | Joyce et al. | |
| 12,242,444 B2 | 3/2025 | Joyce et al. | |
| 2007/0027674 A1 | 2/2007 | Parson et al. | |
| 2008/0027860 A1 | 1/2008 | Mullen et al. | |
| 2008/0201172 A1 | 8/2008 | McNamar | |
| 2009/0123419 A1 | 5/2009 | Sherman et al. | |
| 2009/0276426 A1* | 11/2009 | Liachenko | G06F 16/951 707/999.005 |
| 2009/0276446 A1 | 11/2009 | Graf et al. | |
| 2011/0066602 A1 | 3/2011 | Studer et al. | |
| 2011/0196670 A1 | 8/2011 | Dang et al. | |
| 2012/0030160 A1 | 2/2012 | Ratnam et al. | |
| 2012/0084074 A1* | 4/2012 | Chronister | G06F 16/81 704/9 |
| 2012/0109982 A1 | 5/2012 | Jayakody et al. | |
| 2012/0254333 A1 | 10/2012 | Chandramouli et al. | |
| 2013/0006914 A1 | 1/2013 | Ray et al. | |
| 2013/0031044 A1 | 1/2013 | Miranda et al. | |
| 2013/0073594 A1 | 3/2013 | Jugulum et al. | |
| 2013/0166515 A1 | 6/2013 | Kung et al. | |
| 2014/0108357 A1* | 4/2014 | Procops | G06F 40/18 707/690 |
| 2014/0108460 A1 | 4/2014 | Casella dos Santos et al. | |
| 2014/0280062 A1 | 9/2014 | Augustin et al. | |
| 2015/0032609 A1 | 1/2015 | Abuelsaad et al. | |
| 2015/0095296 A1 | 4/2015 | Nandwani et al. | |
| 2015/0169715 A1 | 6/2015 | Kanellos et al. | |
| 2015/0254230 A1 | 9/2015 | Papadopoullos et al. | |
| 2016/0042225 A1 | 2/2016 | Barak | |
| 2016/0055427 A1 | 2/2016 | Adjaoute | |
| 2016/0171369 A1* | 6/2016 | Majumdar | G06F 40/289 706/46 |
| 2016/0283527 A1 | 9/2016 | Vandiver et al. | |
| 2016/0364325 A1 | 12/2016 | Ouzzani et al. | |
| 2017/0039281 A1* | 2/2017 | Venkata | G06F 16/24534 |
| 2017/0060894 A1* | 3/2017 | Gorelik | G06F 16/16 |
| 2017/0068891 A1* | 3/2017 | Shironoshita | G06F 40/30 |
| 2017/0139975 A1* | 5/2017 | Chow | G06N 5/022 |
| 2017/0177712 A1* | 6/2017 | Kopru | G06F 16/3337 |
| 2017/0193838 A1* | 7/2017 | Buchenau | G06F 16/285 |
| 2017/0235848 A1* | 8/2017 | Van Dusen | G06Q 30/0201 705/12 |
| 2018/0060404 A1* | 3/2018 | Sun | G06F 16/211 |
| 2018/0107694 A1* | 4/2018 | Dupey | G06F 16/2365 |
| 2018/0240019 A1* | 8/2018 | Sato | G06F 40/30 |
| 2019/0087463 A1* | 3/2019 | Dua | G06F 16/24575 |
| 2019/0215331 A1* | 7/2019 | Anakata | H04L 41/046 |
| 2019/0220508 A1* | 7/2019 | Hu | G06F 16/5846 |
| 2019/0317953 A1* | 10/2019 | Browarnik | G06F 16/328 |
| 2019/0370696 A1* | 12/2019 | Ezen Can | G06N 5/025 |
| 2020/0012626 A1* | 1/2020 | Walters | G06N 3/044 |
| 2020/0012666 A1 | 1/2020 | Walters et al. | |
| 2020/0090003 A1* | 3/2020 | Marques | G06N 20/00 |
| 2020/0110736 A1* | 4/2020 | Bauman | G06F 16/22 |
| 2020/0301950 A1* | 9/2020 | Lorrain-Hale | G06F 40/117 |
| 2020/0380212 A1* | 12/2020 | Butler | G06N 20/00 |
| 2021/0192394 A1 | 6/2021 | McKay et al. | |
| 2021/0263900 A1 | 8/2021 | Joyce et al. | |
| 2022/0000245 A1* | 1/2022 | Kim | B65D 51/2878 |
| 2022/0245175 A1 | 8/2022 | Hawco et al. | |
| 2023/0019853 A1* | 1/2023 | Butler | A61P 29/00 |
| 2023/0409835 A1* | 12/2023 | Butler | G06F 16/211 |
| 2024/0072824 A1* | 2/2024 | Cooper | H03M 7/6005 |
| 2024/0095219 A1* | 3/2024 | Joyce | G06F 16/215 |
| 2024/0126734 A1 | 4/2024 | Joyce et al. | |
| 2024/0126735 A1 | 4/2024 | Joyce et al. | |
| 2024/0152495 A1 | 5/2024 | Joyce et al. | |

FOREIGN PATENT DOCUMENTS

| | | |
|---|---|---|
| CN | 106687952 | 5/2017 |
| CN | 106897424 | 6/2017 |
| CN | 109191030 A | 1/2019 |
| CN | 109635288 | 4/2019 |
| CN | 110442568 A | 11/2019 |
| EP | 3745276 | 12/2020 |
| JP | 2015-533436 | 11/2015 |
| JP | 2018-151805 | 9/2018 |
| WO | WO 2015084408 | 6/2015 |
| WO | WO 2018025706 | 2/2018 |

OTHER PUBLICATIONS

Office Action in European Appln. No. 20177617.6, mailed on Mar. 6, 2025, 11 pages.
Office Action in European Appln. No. 21714721.4, mailed on Mar. 6, 2025, 3 pages.
Office Action in Singapore Appln. No. 11202251686X, mailed on Feb. 25, 2025, 16 pages.
Office Action in Canadian Appln. No. 3,142,252, mailed on Jan. 30, 2024, 8 pages.
[No Author Listed] [online], "Get started with data profiling through automatic semantic discovery, Part II—Talend 6 Features," Talend, Nov. 10, 2015, Internet Archive: Wayback Machine URL<https://web.archive.org/web/20210721010236/https://www.youtube.com/watch?v=EltwXhaPASM>, retrieved on Oct. 3, 2024, <https://www.youtube.com/watch?v=EltwXhaPASM>, 173 pages [Video Submission].
[No Author Listed], "Informatica Advanced Masking Solution," Informatica, 2018, 3 pages.
Haldeman, "Compare IBM data masking solutions: InfoSphere Optim and DataStage," IBM Corporation, Nov. 15, 2012, 10 pages.
International Preliminary Report on Patentability in International Appln. No. PCT/US2021/019572, mailed on Sep. 9, 2022, 10 pages.

(56) References Cited

OTHER PUBLICATIONS

International Search Report and Written Opinion in International Appln. No. PCT/US2021/019572, dated Jul. 22, 2021, 14 pages.
International Search Report and Written Opinion in International Appln. No. PCT/US2023/074617, mailed on Jan. 3, 2024, 11 pages.
Invitation to Pay Additional Fees and, Where Applicable, Protest Fee in International Appln. No. PCT/US2021/019572, dated Jun. 1, 2021, 9 pages.
Office Action in Chinese Appln. No. 202080039989.0, mailed on Jul. 15, 2024, 11 pages (with English Translation).
Office Action in Japanese Appln. No. 2021-571432, dated Jul. 8, 2024, 9 pages (with English Translation).
Office Action in Japanese Appln. No. 2022-550704, mailed on May 23, 2024, 5 pages (with English translation).
Office Action in Singapore Appln. No. 11202112388X, dated Aug. 15, 2024, 9 pages.
Office Action in Argentinian Appln. No. 20210100521, mailed on Nov. 5, 2024, 6 pages (with English translation).
Office Action in Canadian Appln. No. 3,167,627, mailed on Nov. 27, 2024, 4 pages.
Office Action in Japanese Appln. No. 2021-571432, mailed on Oct. 21, 2024, 6 pages (with English translation).
Chen et al., "Generating Schema Labels through Dataset Content Analysis," Proceedings of the Web Conference 2018, Apr. 23-27, 2018, Lyon, France, 1515-1522.
EP Extended Search Report in European Appln. No. 20177617.6, dated Sep. 7, 2020, 10 pages.
International Preliminary Report on Patentability in International Appln. No. PCT/US2020/035226, dated Dec. 9, 2021, 9 pages.
Naumann, "Data Profiling Revisited," ACM SIGMOD Record, Feb. 2014, 42(4):40-49.
Office Action in European Appln. No. 20177617.6, dated Aug. 5, 2022, 10 pages.
Office Action in European Appln. No. 20177617.6, mailed on Oct. 31, 2023, 10 pages.
PCT International Search Report and Written Opinion in International Appln. No. PCT/US2020/035226, dated Aug. 19, 2020, 11 pages.
Pham et al., "Semantic Labeling: A Domain-Independent Approach," Proceedings of the 15th International Semantic Web Conference, Oct. 17-21, 2016, Kobe, Japan, 446-462.
Wikipedia.org [online], "Rule-based system," May 16, 2019, retrieved on Aug. 10, 2020, retrieved from URL<https://en.wikipedia.org/w/index/php?title=Rule-based_system&oldid-897374778>, 2 pages.
Anonymous, "Using AI and Machine Learning to Power Data Fingerprinting," Waterline Data, 2017, 6 pages.
IBM.com [Online], "Semantic Concept Discovery Over Event Databases," retrieved Dec. 10, 2019, retrieved from URL <https://www.ibm.com/blogs/research/2018/07/semantic-concept-discovery/>, 4 pages.
Talend [Online] "Get started with data profiling through automatic semantic discovery, Part II—Talend 6 Features," published on Nov. 10, 2015, retrieved Dec. 10, 2019, <https://www.youtube.com/watch?v=EltwXhaPASM&feature=emb_title>, 1 page [Video Submission].
talend.com [Online] "Semantic Discovery," retrieved Dec. 10, 2019, retrieved from URL <https://help.talend.com/reader/nAXiZWojOH~2~YApZIsRFw/uLT6CFkPAjCbZ30Tf9juFw> 8 pages.
techopedia.com [Online] "Semantic Data Model—General process of adding meaning to data and the relationships that lie between them," retrieved on Dec. 10, 2019m retrieved from URL <https://www.techopedia.com/definition/30489/semantic-data-model>, 1 page.
Extended European Search Report in European Appln. No. 25153769.2, mailed on Apr. 9, 2025, 8 pages.
International Preliminary Report on Patentability in International Appln. No. PCT/US2023/074617, mailed on Apr. 3, 2025, 9 pages.
Office Action in Australian Appln. No. 2021226330, mailed on Jun. 12, 2025, 2 pages.
Office Action in Australian Appln. No. 2023347913, mailed on May 2, 2025, 4 pages.
Office Action in Indian Appln. No. 202217046126, mailed on Jun. 2, 2025, 9 pages.
Office Action in Japanese Appln. No. 2024-102886, mailed on Jul. 11, 2025, 6 pages (with English translation).

* cited by examiner

DISCOVERING A SEMANTIC MEANING OF DATA FIELDS FROM PROFILE DATA OF THE DATA FIELDS

CLAIM OF PRIORITY

This application claims priority to U.S. patent application Ser. No. 16/794,361, filed on Feb. 19, 2020, which claims priority under 35 U.S.C. § 119(e) to U.S. Patent Application Ser. No. 62/855,233, filed on May 31, 2019, the entire contents of each of which are hereby incorporated by reference.

TECHNICAL FIELD

This disclosure relates to the classification of data. More specifically, this disclosure relates to classifying data fields by analyzing a data profile of the data and metadata of the data fields.

BACKGROUND

A set of data can include data content stored in data fields. A data field can indicate a type of the data content stored in that data field.

SUMMARY

The following systems and processes described in this disclosure can include one or more of the following advantages. In many systems, existing data sets that can be very large and undocumented. In some cases, if the data sets are labeled, the labels can be inconsistent or technical in nature such that it is difficult to ascertain business information from the labels. Due to legacy systems, and versioning of the systems over time, if can be difficult to determine what each portion of the data set is in a practical context. There is a need to develop annotation to such data sets.

These systems and processes are configured to rapidly and, in some cases, automatically provide labels for data sets. The system and processes described in this document are configured to perform a series of statistical checks on metadata and data content of a data set in order to discover, classify, and label data content of the data set. Discovering data content includes determining that the data content (or data field) is present in the data set. For example, the systems and processes described in this disclosure provide for the labeling of data fields (e.g., columns in a table or a database) that is either non-labeled or labeled in a non-meaningful way. These systems and processes are configured to discover that particular data fields are present in the data set and label the particular data fields. To do this labelling, the systems and processes described in this document are configured to map a descriptive definition to fields of the data set, such as by assigning business terms or domains to the fields of the data sets. The labels that are generated for the data fields provide information about the data content stored in the data fields. The information can indicate what kind of data content is included in the data fields (e.g., phone numbers, first names, dates, etc.).

The information can be used by computing systems for various applications. For example, applications that can use the generated labels of data sets can include data quality enforcement, personal data anonymization, data masking, personally identifiable information (PII) reports, test data management, data set annotation, and so forth. For example, comment data may include PII, and may require masking. In another example, the systems and processes described in this document can provide a mechanism to label $3^{rd}$ party data from different sources. This can be useful for systems in which the system administrator is responsible for knowing and understanding what data is in the data set stored on the system, such as for regulatory reasons.

In addition, the systems and processes described herein enable an infrastructure to be built that allows data standards to be applied across many different data items from different data sources. The infrastructure can be easily modified (e.g., by adding definitions to classification tests through a user interface) so that additional tests can be added as new data requirements are determined.

In an aspect, a system is configured for identifying a field included in one or more data sets, with the field having an identifier; and for that field: profiling, by a data processing system, one or more data values of the field to generate a data profile; accessing a plurality of label proposal tests; based on applying at least the plurality of label proposal tests to the data profile, generating a set of label proposals; determining a similarity among the label proposals in the set of label proposals; based at least on the similarity among the label proposals in the set, selecting a classification; based on the classification, rendering a graphical user interface that requests input in identifying a label proposal that identifies the semantic meaning or determining that no input is required; identifying one of the label proposals as identifying the semantic meaning; and storing, in a data store, the identifier of the field with the identified one of the label proposals that identifies the semantic meaning. The function of the preamble is to set forth the general technical environment of the invention.

In some implementations, profiling the one or more data values of the field includes determining a format of a data value of the field. Profiling the data values of the field includes determining a statistical value representing the data values included in the field. The statistical value comprises at least one of a minimum length of the data values of the field, a maximum length of the data values of the field, a most common data value of the field, a least common data value of the field, a maximum data value of the field, and a minimum data value of the field. Applying the plurality of label proposal tests includes: determining that the field includes a primary key for a data set of the one or more data sets; and selecting a label proposal test of the plurality of label proposal tests that are that is related to the primary key. Applying the plurality of label proposal tests includes: performing a metadata comparison of data values of the field to terms in a glossary of terms. Applying the plurality of label proposal tests includes: determining, from the data profile, a pattern represented by the data values stored of the field; determining a particular label that is mapped to the pattern; and labeling the field with the particular label. Applying the plurality of label proposal tests includes: retrieving a list of values that are representative of a data collection; comparing the data values of the field to the list of values; determining, in response to the comparing, that a threshold number of the data values match the values of the list; and in response to the determining, labeling the field with a particular label that specifies the data collection. Applying the plurality of label proposal tests includes: generating at least two labels for the field; and determining whether the at least two labels are exclusive or inclusive of one another.

In some implementations, the system is configured to perform actions further including: determining, in response to applying the plurality of label proposal tests, a relationship between the field and another field of the one or more data sets. The relationship includes one of an indication that a first data value the field determines a second data value stored in the other field, an indication that the first data value correlates to the second data value, or an indication that the first data value is identical to the second data value. The plurality of label proposal tests are each associated with at least one weight value, the method further including: updating a weight value associated with at least one label proposal test; and reapplying the label proposal test to the data profile using the updated weight value.

In some implementations, the actions are further including training the plurality of label proposal tests using a machine learning process. The actions include retrieving, from a data quality rules environment, one or more data quality rules that are assigned to the label proposal specifying the semantic meaning; and assigning a data quality rule of the one or more data quality rules to the field. Comparing the label proposals generated from the label proposal tests includes: applying a score value to each label proposal; for each label of the label proposals, combining the score values associated with that label; and ranking the labels according to the score value associated with each label.

In some implementations, the actions are further including: receiving validation of the label proposals from the plurality of label proposal tests; and responsive to receiving the validation, weighting the plurality of label proposal tests with the label proposals. The data store includes a data dictionary. In some implementations, the actions are further including: outputting the label proposals to a data quality rules environment. In some implementations, the actions are further including: reducing, based on the identified one of the label proposals, a number of errors for processing data for the field using data quality rules from the data quality environment relative to another number of errors for processing the data for the field without using the identified one of the label proposals.

In an aspect, system includes a data storage storing instructions; and at least one processor configured to execute the instructions stored by the data storage to perform operations including: identifying a field included in one or more data sets, with the field having an identifier; and for that field: profiling, by a data processing system, one or more data values of the field to generate a data profile; accessing a plurality of label proposal tests; based on applying at least the plurality of label proposal tests to the data profile, generating a set of label proposals; determining a similarity among the label proposals in the set of label proposals; based at least on the similarity among the label proposals in the set, selecting a classification; based on the classification, rendering a graphical user interface that requests input in identifying a label proposal that identifies the semantic meaning or determining that no input is required; identifying one of the label proposals as identifying the semantic meaning; and storing, in a data store, the identifier of the field with the identified one of the label proposals that identifies the semantic meaning.

In some implementations, profiling the one or more data values of the field includes determining a format of a data value of the field. Profiling the data values of the field includes determining a statistical value representing the data values included in the field. The statistical value comprises at least one of a minimum length of the data values of the field, a maximum length of the data values of the field, a most common data value of the field, a least common data value of the field, a maximum data value of the field, and a minimum data value of the field. Applying the plurality of label proposal tests includes: determining that the field includes a primary key for a data set of the one or more data sets; and selecting a label proposal test of the plurality of label proposal tests that are that is related to the primary key. Applying the plurality of label proposal tests includes: performing a metadata comparison of data values of the field to terms in a glossary of terms. Applying the plurality of label proposal tests includes: determining, from the data profile, a pattern represented by the data values stored of the field; determining a particular label that is mapped to the pattern; and labeling the field with the particular label. Applying the plurality of label proposal tests includes: retrieving a list of values that are representative of a data collection; comparing the data values of the field to the list of values; determining, in response to the comparing, that a threshold number of the data values match the values of the list; and in response to the determining, labeling the field with a particular label that specifies the data collection. Applying the plurality of label proposal tests includes: generating at least two labels for the field; and determining whether the at least two labels are exclusive or inclusive of one another.

In some implementations, the system is configured to perform actions further including: determining, in response to applying the plurality of label proposal tests, a relationship between the field and another field of the one or more data sets. The relationship includes one of an indication that a first data value the field determines a second data value stored in the other field, an indication that the first data value correlates to the second data value, or an indication that the first data value is identical to the second data value. The plurality of label proposal tests are each associated with at least one weight value, the method further including: updating a weight value associated with at least one label proposal test; and reapplying the label proposal test to the data profile using the updated weight value.

In some implementations, the actions are further including training the plurality of label proposal tests using a machine learning process. The actions include retrieving, from a data quality rules environment, one or more data quality rules that are assigned to the label proposal specifying the semantic meaning; and assigning a data quality rule of the one or more data quality rules to the field. Comparing the label proposals generated from the label proposal tests includes: applying a score value to each label proposal; for each label of the label proposals, combining the score values associated with that label; and ranking the labels according to the score value associated with each label.

In some implementations, the actions are further including: receiving validation of the label proposals from the plurality of label proposal tests; and responsive to receiving the validation, weighting the plurality of label proposal tests with the label proposals. The data store includes a data dictionary. In some implementations, the actions are further including: outputting the label proposals to a data quality rules environment. In some implementations, the actions are further including: reducing, based on the identified one of the label proposals, a number of errors for processing data for the field using data quality rules from the data quality environment relative to another number of errors for processing the data for the field without using the identified one of the label proposals.

In an aspect, a system includes means for identifying a field included in one or more data sets, with the field having an identifier; for that field: means for profiling, by a data processing system, one or more data values of the field to generate a data profile; means for accessing a plurality of label proposal tests; means for generating, based on applying at least the plurality of label proposal tests to the data profile, a set of label proposals; means for determining a similarity among the label proposals in the set of label proposals; means for selecting, based at least on the similarity among the label proposals in the set, a classification; means for rendering, based on the classification, a graphical user interface that requests input in identifying a label proposal that identifies the semantic meaning or determining that no input is required; means for identifying one of the label proposals as identifying the semantic meaning; and means for storing, in a data store, the identifier of the field with the identified one of the label proposals that identifies the semantic meaning.

In some implementations, profiling the one or more data values of the field includes determining a format of a data value of the field. Profiling the data values of the field includes determining a statistical value representing the data values included in the field. The statistical value comprises at least one of a minimum length of the data values of the field, a maximum length of the data values of the field, a most common data value of the field, a least common data value of the field, a maximum data value of the field, and a minimum data value of the field. Applying the plurality of label proposal tests includes: determining that the field includes a primary key for a data set of the one or more data sets; and selecting a label proposal test of the plurality of label proposal tests that are that is related to the primary key. Applying the plurality of label proposal tests includes: performing a metadata comparison of data values of the field to terms in a glossary of terms. Applying the plurality of label proposal tests includes: determining, from the data profile, a pattern represented by the data values stored of the field; determining a particular label that is mapped to the pattern; and labeling the field with the particular label. Applying the plurality of label proposal tests includes: retrieving a list of values that are representative of a data collection; comparing the data values of the field to the list of values; determining, in response to the comparing, that a threshold number of the data values match the values of the list; and in response to the determining, labeling the field with a particular label that specifies the data collection. Applying the plurality of label proposal tests includes: generating at least two labels for the field; and determining whether the at least two labels are exclusive or inclusive of one another.

In some implementations, the system is configured to perform actions further including: determining, in response to applying the plurality of label proposal tests, a relationship between the field and another field of the one or more data sets. The relationship includes one of an indication that a first data value the field determines a second data value stored in the other field, an indication that the first data value correlates to the second data value, or an indication that the first data value is identical to the second data value. The plurality of label proposal tests are each associated with at least one weight value, the method further including: updating a weight value associated with at least one label proposal test; and reapplying the label proposal test to the data profile using the updated weight value.

In some implementations, the actions are further including training the plurality of label proposal tests using a machine learning process. The actions include retrieving, from a data quality rules environment, one or more data quality rules that are assigned to the label proposal specifying the semantic meaning; and assigning a data quality rule of the one or more data quality rules to the field. Comparing the label proposals generated from the label proposal tests includes: applying a score value to each label proposal; for each label of the label proposals, combining the score values associated with that label; and ranking the labels according to the score value associated with each label.

In some implementations, the actions are further including: receiving validation of the label proposals from the plurality of label proposal tests; and responsive to receiving the validation, weighting the plurality of label proposal tests with the label proposals. The data store includes a data dictionary. In some implementations, the actions are further including: outputting the label proposals to a data quality rules environment. In some implementations, the actions are further including: reducing, based on the identified one of the label proposals, a number of errors for processing data for the field using data quality rules from the data quality environment relative to another number of errors for processing the data for the field without using the identified one of the label proposals.

Other features and advantages of the system will become apparent from the following description, and from the claims.

DETAILED DESCRIPTION

Figure 1A:
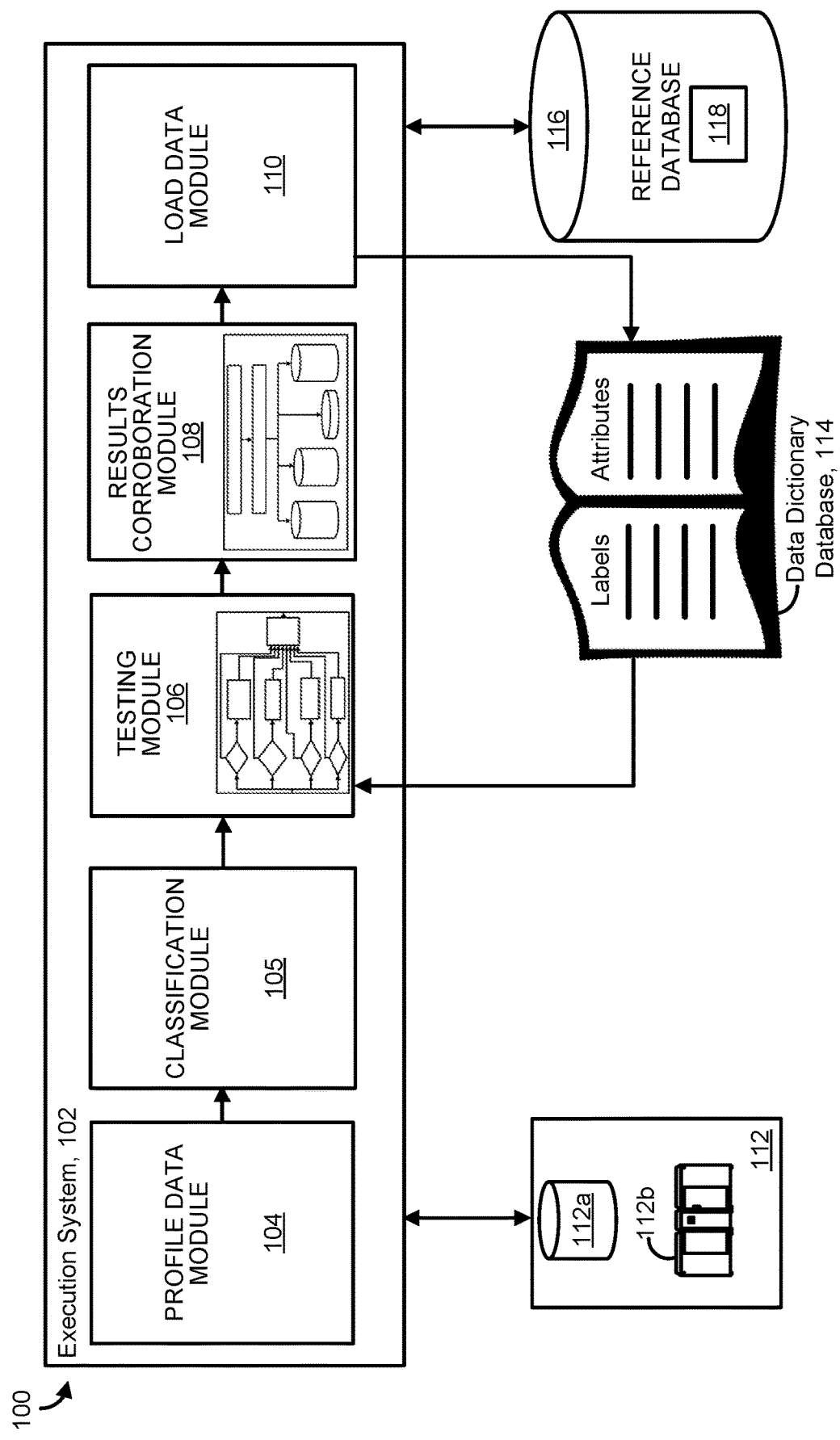
FIGS. 1A-1B are block diagrams of a system for discovering, classifying and labeling data fields by analyzing a data profile generated from data of the data fields.
Figure 1B:
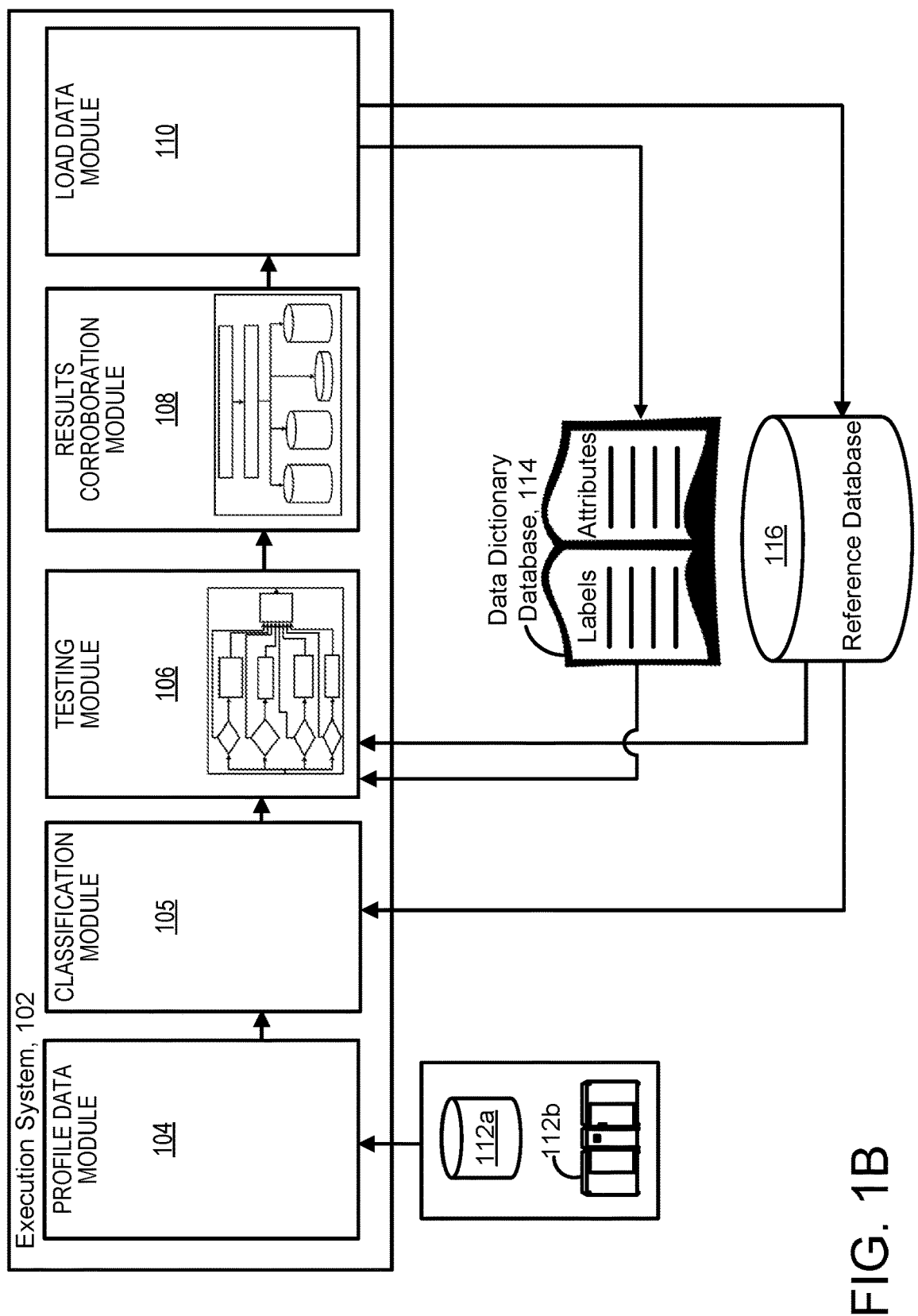

Referring to FIGS. 1A-1B, networked system 100 for discovering, classifying and labeling data fields by analyzing a data profile generated from data of the data fields is shown. The networked system 100 includes an execution system 102, one or more data sources 112, a reference database 116, and a data dictionary database 114. The execution system 102 is configured to receive source data from data source(s) 112a, 112b (collectively data sources 112) in the networked system 100. The execution system 102 is configured to profile source data received from the data sources 112 to generate a data profile representing the source data of the data sources 112. The execution system 102 is configured to analyze the profile data to discover, classify (e.g., test), and associate portions of the source data with labels representing the semantic meaning of those portions of the source data. A portion of the source data can include a field in the source data. In other words, the execution system 102 uses the profile data to determine, using a plurality of classification tests, a semantic meaning for one or more fields of the source data. Classifying the source data comprises associating a probability with the portion of the source data. The probability specifies a likelihood that the portion of the source data corresponds to a label included in the data dictionary database 114.

Generally, the execution system 102 includes a profile data module 104, a classification module 105, an testing module 106, an results corroboration module 108, and a load data module 110, which together are configured to discover, classify, and label the data fields of the data received from the data sources 112. A general description of the labeling process by the execution system 102 (also called the semantic discovery process) is now described. The profile data module 104 receives source data 112 and generates profile data. As subsequently described, the profile data includes metadata representing statistical attributes of the source data and the fields of the source data. The profile data can also include data specifying relationships (e.g., statistical correlations, dependencies, and so forth) between or among the fields of the source data.

The classification module 105 classifies each field as having a data type (e.g., a date field, a numeric field, a string, etc.). The classification module checks the reference database 116 for a label index to determine whether the field (or other fields having a same field name) have already been labeled with a semantic label.

Generally, each field in the data set is associated with an identifier, such as a field name. The identifier can also include a field address specifying the location of the field in the data set. For example, the identifier can specify what table the field is in and what column of the table represents the field. In some implementations, the identifier is part of a label index, which associates identifiers of each field with semantic labels for those fields. The identifier can be the name of the field, a key value, or some other value that identifies the field.

The testing module 106 includes a plurality of classifiers each configured to operate on data values of the fields, the field names, and the profile data for each field. The classifiers (also called tests) of the testing module 106 each propose a label to be associated with the field using different methodologies, described in greater detail below. The tests use the dictionary of labels from data dictionary database 114 as a library of labels from which one or more labels can be proposed as identifying the semantic meaning of the field being tested. The tests may propose different labels from one another as a result of using the different methodologies, or the proposed labels can the same from all the tests. The proposed labels (and their scores, if applicable) from each test of the testing module 106 are sent to the results corroboration module 108.

The results corroboration module 108 buckets the proposed labels for a field into a category based on an amount of similarity among the proposed labels of the tests. If the proposed labels are all the same, the amount of similarity is high and a match is found. The results corroboration module 108 can also categorize the group of proposed labels for each field from the testing module 106 as recommended (with one of the proposed labels being the recommended label). The results corroboration module 108 can find that there is little similarity among the proposals and suggest that a user investigate the results further. The results corroboration module 108 can also categorize proposed labels from the testing module 106 as to be ignored, as subsequently described. The execution system 102 can receive validation data (e.g., from a user through a user interface) validating a proposed label as correctly identifying the semantic meaning of the field. Once validated, the proposed label is assigned to the field and the label index is updated to show that the field is associated with the assigned label. The load data module 110 sends the label index to the reference database 116 for access by future iterations of the labeling process (also called the sematic discovery process) or for access by downstream applications. The functions of the modules 104, 105, 106, 108, and 110 are subsequently described in greater detail with respect to FIGS. 2A-3G.

The data dictionary database 114 includes a list of labels that are candidate labels for identifying the semantic meaning of fields of the source data. Each label of the data dictionary database 114 is associated with one or more attributes. The attributes describe the semantic meaning of the label, and can include tags, associations, or other metadata that provide context to the execution system 102 of what the semantic meaning of each label is. For example, an attribute can include statistical metadata describing values of a given field, a tag for a specific set of values for the field (e.g., a list of city names, zip codes, etc.), a specified data format (e.g., a date format), a relationship between or among fields of a data set, and so forth. During the testing (classification) process, the execution system 102 is configured to determine how closely the attributes of the label align with the attributes of the fields of the source data. The classification tests are configured to analyze the profile data of the fields and the content of the fields themselves to determine which labels of the data dictionary database 114 identify the semantic meaning of the fields. The data dictionary database 114 can be populated with a list of labels and label attributes prior to performing the semantic discovery process by the execution system 102.

As shown in FIG. 1A, the data dictionary database 114 is extensible, as new labels can be added to the data dictionary database 114 as data with new semantic meanings are processed by the execution system. In some implementations, a set of seed labels can be automatically provided to initialize the system, and additional labels can be added as needed if the existing labels of the data dictionary database 114 do not identify the semantic meaning of the fields. For example, if the execution system 102 fails to find a label in the data dictionary database 114 having attributes that satisfy the classification tests (e.g., a score for each test is below a threshold value), the execution system 102 can prompt a user to define a new label for the data dictionary database 114 as having attributes that correspond to the unlabeled field. In subsequent tests, the execution system 102 is configured to propose the newly defined label for labeling subsequent fields having similar attributes.

The execution system 102 is configured to, either automatically or in response to user input, tag the portion of the source data with one or more labels identifying the semantic meaning of the portions of the source data. The discovery, classification, and labeling of the source data can be iterated to improve the classification of the source data and increase the accuracy of labeling the source data. The labels of the source data comprise metadata that is associated with the source data as a label index, as subsequently described. Once the discovery, classification, and labeling of the source data are completed, the label index is loaded into the reference database 116 for use by one or more downstream applications.

As shown in FIG. 1B, once the profiling, classification, and labeling of the source data has been performed by the execution system 102, the load data module 110 can send data to each of the data dictionary database 114 and the reference database 116. If additional labels are defined during or as a result of the semantic discovery process, the newly defined labels are added to the data dictionary database 114 for use in future labeling by the execution system 102 (e.g., by the testing module 106). In addition or in the alternative, the load data module 110 sends label index data to the reference database 116. The label index describes, for the source data, which label is associated with each field of the source data that has been labeled by the execution system 102. For example, for each label, the label index can include a list of each field that is associated with that label. Alternatively, the label index can describe, for each field of the source data, which labels are associated with that field. The label index is stored in the reference database 116. In a subsequent labeling process by the execution system 102, the label index can be checked (e.g., by the classification module 105) to determine whether a particular field has already been labeled. This can cause the execution system 102 to bypass the testing process and simply label the field with the known label, reducing an amount of data that are processed for labeling the fields. In some implementations, the data indicating that a label has already been applied to the field (or a similar field) can be used during the testing processes to increase the accuracy of the classifiers of the tests, as subsequently described.

The label index can indicate, though the attributes of the designated labels, what the semantic relationships between the fields are (e.g., whether they correlate to one another, whether there is a dependency, and so forth). Because this semantic meaning is included in the attributes of each of the labels, the application need only refer to the label index, rather than scan the dataset itself, to retrieve semantic information. Reducing the amount of data to be processed by the downstream application reduces processing resources for the application, because only the label index is needed to determine the semantic meaning for each field in the dataset. In an example, the label index may indicate which fields in the dataset include PII. Without scanning each field of the dataset, the application can mask just those fields with PII as needed. As such, the application can access the data store storing the dataset fewer times, and less data can be transmitted (reducing bandwidth usage).

In some implementations, the data dictionary can also be provided to the application. The relatively small data footprint of the data dictionary and the label index can be useful in situations where the dataset is large in size. The sizes of the label index and the data dictionary each increase slowly relative to the size of the dataset itself. Rather than requiring the entire dataset to be retrieved to provide adequate context to the application, the label index and the data dictionary provide all the context that the application needs to access only the relevant portions of the dataset. The application can simply refer to the label of a dataset and the attributes of the label to determine the context of the field in the dataset.

The source data of the data source 112 can include several different kinds of data. In one example, the source data of the data source(s) 112 includes tables with data fields. The execution system 102 is configured to discover, classify, and label the data fields of the tables. For example, the execution system 102 analyses the data content of each discovered field of the source data and determines what the data content of the data field is representing. The execution system 102 classifies each data field by associating the data field with a known label (e.g., by assigning it a probability value). The labeled data of the tables can be output to a data storage 114 that is accessible by other applications and systems for operating on the labeled data. The process of discovering, classifying, and labeling the data fields of data tables is subsequently described in detail. Data sources 112 can include any type of computing system. For example, data sources 112 can include mainframes, databases, unstructured data supplied from a third party, data lakes, personal computers, high-scale networks, and so forth.

In this disclosure, the processes for discovering, classifying, and labeling data fields of data tables are used as examples to illustrate the functionality of the execution system 102 and the networked system 100. However, while data fields are one example of something that the execution system 102 is configured to discover, classify, and detect, the execution system 102 can operate on other types of data. For example, the execution system 102 receives application data from an application. The execution system 102 is configured to discover, classify, and label different data for the application. The data can include different files that are stored and accessed for operating the application. The execution system 102 can be used to discover PII stored by applications, discover malware, changes to the application files, and so forth. In another example, the execution system 102 can analyze files stored in a file system (e.g., on a personal computer). The execution system 102 can scan the file system to identify a particular file subset defined by the user. For example, a user might wish to remove work files from a home computer before reformatting the home computer. The execution system 102 can be configured to scan the file system of the home computer and tag all the work files. The execution system 102 can be configured to label data for data subjects' rights, such as right to forget, data erasure, subject access requests, data correction requests, data suspension, data portability, and consent. Numerous other applications are possible.

To discover, classify, and label portions of the source data (such as data fields), the execution system 102 is configured to access a reference database 116 for one or more files 118. The files 118 provide the execution system 102 with context for performing the discovery, classification, and labeling of the source data. In some implementations, the reference database 116 can store a lookup table that stores relationships between values that are found in entries of the data fields. For example, the data storage can include a lookup table matching codes to a glossary of terms which can be referenced by the execution system 102 during discovering, classifying, and labeling of the source data. The files 118 of the reference database 116 can include weight values used for classification. For example, the weight values can indicate to the execution system 102 the probability that two terms (e.g., business terms) are related to one another for the source data 112 being labeled. These values can be generated during an initial iteration of the discovering, classifying, and labeling of the source data 118, and updated during subsequent iterations, either by the user or automatically.

The files 118 can be defined in advance of discovering, classifying, and labeling of the source data by the execution system 102, during the discovering, classifying, and labeling, or after the discovering, classifying, and labeling in an iterative process. A development environment (not shown)

of the networked system 100 can provide a means by which the user can write to the reference database 116 or update files 118 of the data storage. For example, the development environment can include a user interface that provides feedback to a user of the execution system 102. For example, the user interface of the development environment can display reports showing how the execution system 102 is performing, such as what data fields are labeled and with what probability each classification is made by the execution system 102. Examples of feedback provided to the user and the user interface are subsequently described in detail.

Generally, the execution system 102 comprises one or more processors configured to execute the logic of the profile data module 104, the classification module 105, the testing module 106, the results corroboration module 108, and the load data module 110. The operations of each of the profile data module 104, the classification module 105, the testing module 106, the results corroboration module 108, and the load data module 110 can be performed either by batch processing or in real-time. Additionally, the execution system 102 can perform the operations of each of the modules 104, 105, 106, 108, 110 either approximately contemporaneously or during different time periods. For example, in some implementations, the profile data module 104 generates profile data representing a profile of the source data from the data sources 112 at a first time. At a later time, once all the data from the data sources 112 for a given time period has been profiled by the profile data module 104, the classification module 105, the testing module 106, results corroboration module 108, and load data module 110 can analyze the profile data to discover, classify, and label data fields of the source data and load the data into the data storage 116 for one or more downstream applications.

Figure 2A:
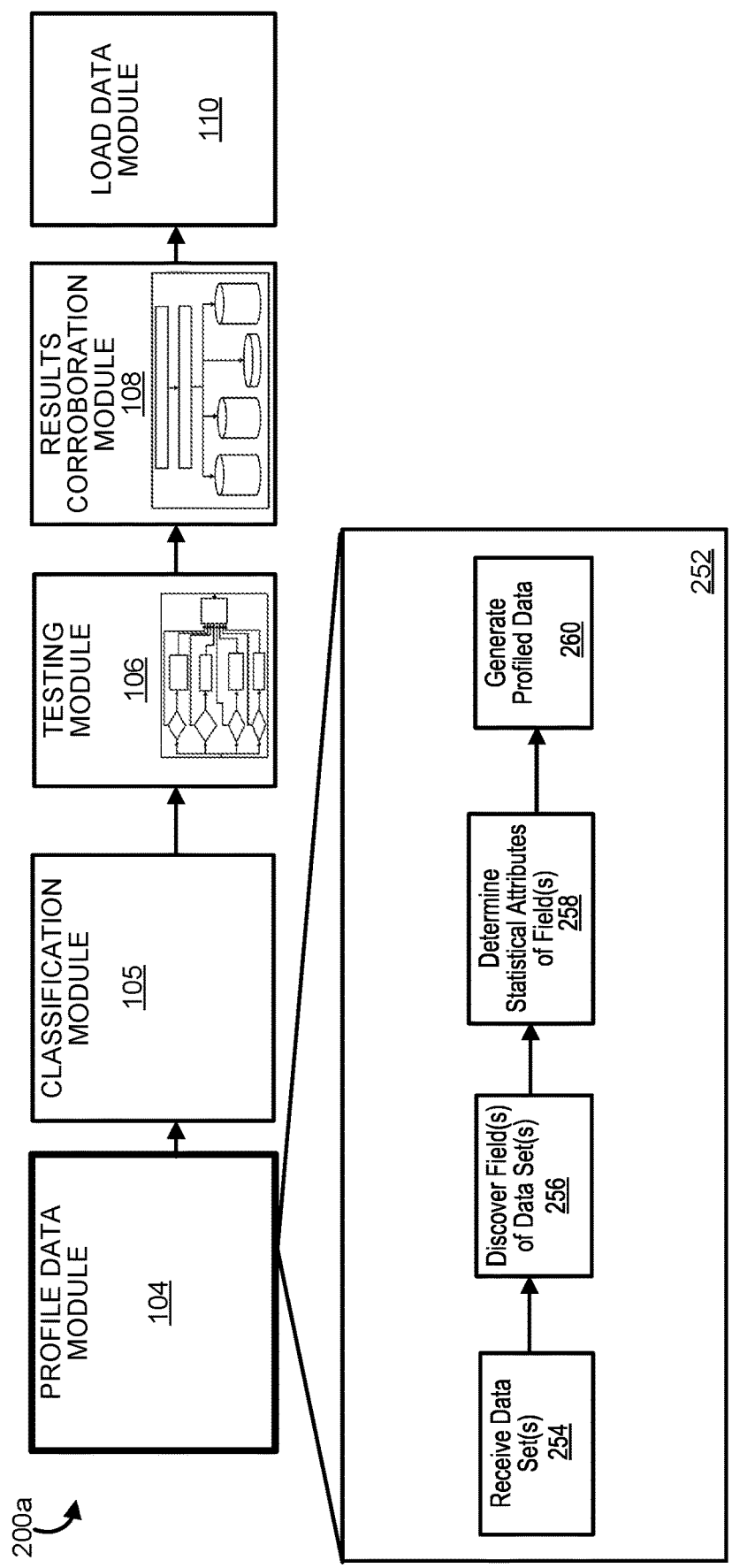
FIGS. 2A-2E are block diagrams of showing how the execution system 202 profiles, classifies, and labels data fields to identify a semantic meaning for the data fields.

FIGS. 2A-2E are block diagrams of showing how the execution system 202 profiles, classifies, and labels data fields to identify a semantic meaning for the data fields. Turning to FIG. 2A, a process 200*a* for profiling the data sources by the profile data module 104 is shown. The profile data module 104 is configured to receive (254) the source data (e.g., tables, files, etc.) and generate a data profile of the source data. The profile data module 104 discovers (256) fields of the source data (e.g., one or more data sets). The profile data module 104 can discover fields by identifying rows of tables in the source data, finding field names, references to fields, or using any similar process. The profile data module 104 determines (258) statistical attribute(s) of the data fields and generates (260) profile data including those statistical attributes. The profile data identifies patterns in the source data. More specifically, the profile data includes statistics about the values of data fields of tables of the source data. For example, the profile data can include information specifying whether the data values of a data field include numerical data, character strings, etc. For example, the statistics about the data values can include a maximum value, a minimum value, a standard deviation, a mean, and so forth of the values that are included in each of the data fields (if the data are numerical). In some implementations, the statistics about the data can include how many digits or characters are in each entry of the data values. For example, the data profile can indicate that each data value of a data field includes seven (or ten) numbers, which may provide a contextual clue indicating that the data field includes telephone numbers. For example, the data profile can indicate that each entry of the data field includes a value from a small set of values, which may be used to trigger comparisons to lookup tables by the testing module 106.

Data ingestion for the profile data module 104 includes analyzing the field names of the fields, the location of the fields in the tables (or files in the file system), and analysis of the schema of the data. In other words, data ingestion occurs at the field level, the dataset level, and the schema level.

For the field level, the profile data module 104 analyzes the values of the fields and entries of the fields to generate the profile data. The profile data module 104 can determine whether the value of the field or its entries are null, blank, valid for a particular data type, and so on. The profile data can include statistics on null percentages, blank percentages, and value per field percentages. The profile data module 104 can also generate data indicate a change of these percentages from a baseline percentage (which can be specified by a user through the development environment or automatically generated). In another example, the profile data can include an indication of whether the data of an entry is valid for implicit data type. For example, if a data field is known to be a string field, but date data is found, it may be inferred that the data are invalid for that entry. In another example, the profile data can include an indication that data of an entry are valid for a specified format (e.g., two decimal places are required, but no explicit type is specified). In some implementations, some of this functionality is executed by the testing module 106 after the profile data are generated.

For the dataset level, the profile data module 104 can provide statistics that relate a portion of the source data to the data set of the source data overall. For example, the profile data module 104 includes an indication of natural key uniqueness and key cardinality. The profile data module 104 indicates whether there exist duplicates on key values of the source data. The profile data module 104 indicates whether there are duplicates on approximate natural key matches. The profile data module 104 indicates a count of records with one or more of these features. In some implementations, this information is determined by the results corroboration module 108 after, for example, a field is determined to be key values.

For the schema level, the profile data module 104 is configured to determine the statistical information of a data field with respect to the source data over time. For example, the profile data module 104 detects whether there are added or removed columns in a new version of the source data. The profile data module 104 detects delimited fields. In some implementations, the profile data module 104 performs a lineage count to determine whether any records were dropped from a prior version of the source data. Other schema evolution can be detected. In some implementations, this functionality is performed by the results corroboration module 108 after data fields are discovered in the profile data.

In some implementations, the profile data can be improved if contextual data are available in the reference database 116. For example, if the user specifies formats for one or more data fields of the source data, the profile data can generate additional statistical information about those data fields. This can be part of an iterative process. For example, once a data field is discovered in a first iteration (but if classification fails for that iteration), a user might look at the data content of the data field and provide the execution system 102 with additional information for analysis by the profile data module 104 (and other data modules). For example, if the user specifies that all data fields should include only numerical data, the profile data module 104 can quickly determine what data is invalid and provide statistical measures of the that information in the data profile.

The profile data module 104 generates the profile data from the source data by scanning the entire data set of the source data before generating the profile data. The profile data module 104 does not need to copy the entire data set from the source data, though this could be performed to generate the profile data. Because the data sets can be large (e.g., many gigabytes in size or even many terabytes in size), wholesale copying of the data to a local system for analysis may be impractical. Generally, the profile data module 104 scans over the source data during periods of low activity for the data sources.

Figure 2B:
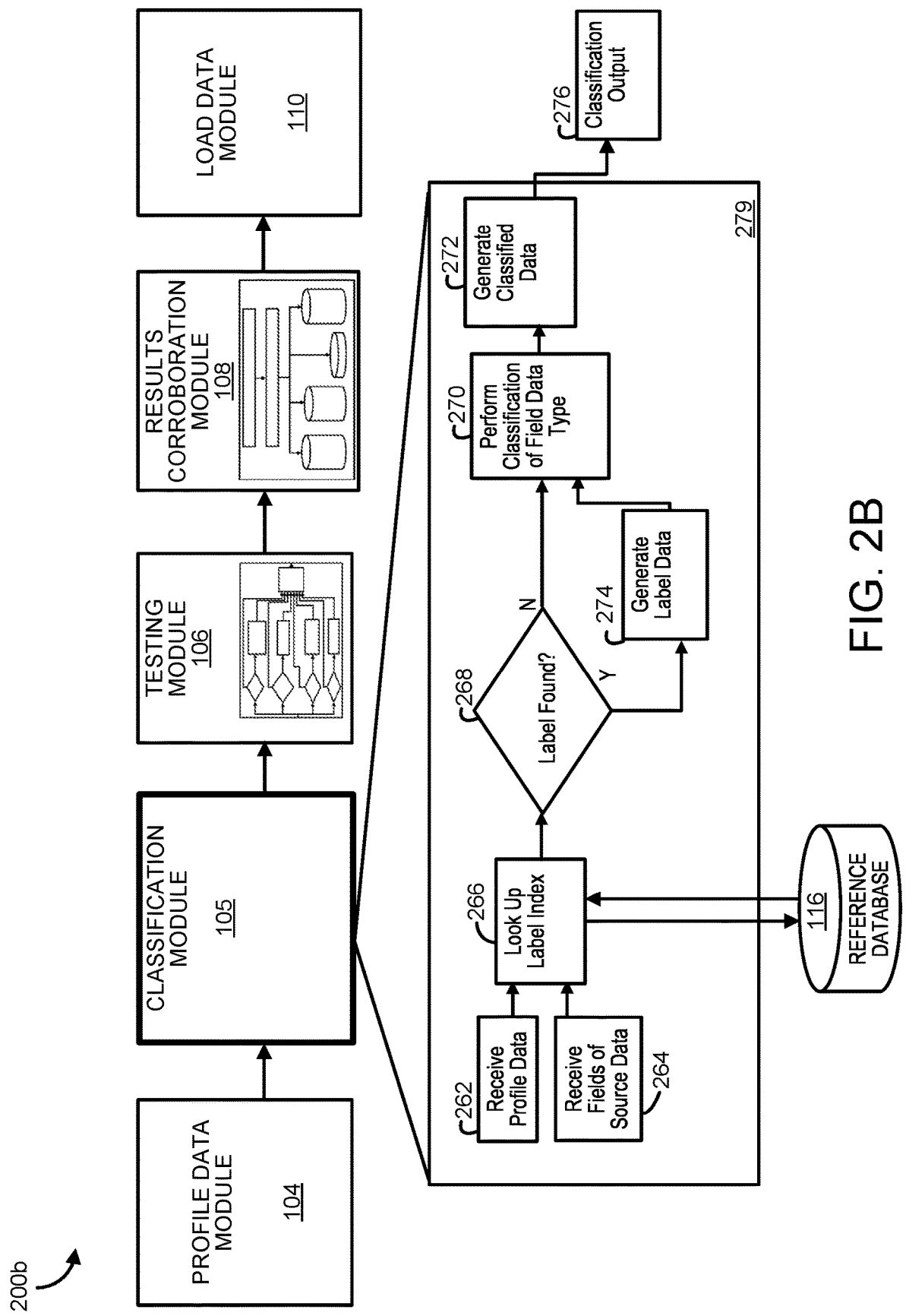

Turning to FIG. 2B, a process 200b for classifying the data fields using the profile data by the classification module 105 is shown. The classification module 105 is configured to receive (262) the profile data and receive (264) the source data including the fields. For each field of the source data, the classification module 105 is configured to look up (266) the label index including existing labels for discovered fields of the source data (e.g., from the reference database 116). These labels can be from prior iterations of the labeling process or the label index (e.g., an initial label index) can be manually generated, imported, or otherwise acquired. However, a label index need not exist prior to performing the labeling process.

For a field, the classification module determines (268) whether the field is already associated with a label in the label index. If a field has not yet been labeled, or if no label index exists, the classification module 105 determines that no label was found for the field. If needed, the classification module 105 generates a new label index to populate with semantic labels. The classification module 105 performs (270) a classification of the field data type. The classification can be based on the profile data of the field, the field name, and the values of the field. For example, the classification module 105 can determine that a field is a "date" field. In some implementations, the classification module 105 can determine that the field is a numeric field, a string field, or other such data type. While the classification module 105 determines a data type for the field, the semantic meaning of the field (and thus the semantic label) is determined by the testing module 106, as subsequently described. For example, the classification module 105 can determine that the field is a date field, and the testing module 106 determines that the dates of the date field are "Dates of Birth" for customers. In another example, the testing module 106 determines that a numeric field is a "User ID" field. Many other such examples are possible. The classification module 105 generates (272) classified data to be sent to the testing module 106 as a classification output 276 for finding the semantic meaning. The classified data is tagged with the data type determined by the classification module 105.

If a label is found, the classification module generates (274) label data that can be passed through the testing module 106 and the results corroboration module 108. The label data informs the testing module 106 and the results corroboration module 108 that the field has already been labeled. This can be used to weight the classifiers applied to the field or suggest a label. However, the field can be re-classified by the classification module 105 and re-tested by the testing module 106 to confirm that the label is accurate and potentially update the label attributes of that label in the data dictionary database 114. For example, if the testing module 106 finds the existing label to be a poor fit, a new label can be suggested. If a user selects the existing label (e.g., as presented by the results corroboration module 108), the label data can be used as a flag to the execution system 102 that the label attributes of the label in the data dictionary database 114 are not representative of the data values being labeled by that label, and these attributes can be updated.

In some implementations, the classification module 105 can be updated over multiple iterations using machine learning approaches. For example, if a discovered field has already been labeled, the classifier can determine that further classification can be bypassed. In another example, a score that was applied to a field can be updated based on additional data that is received from the data source 112 or from user input. The classification module 105 can determine that different test(s) should be performed by the testing module 108 in comparison to a prior iteration. For example, if a fingerprint analysis was inconclusive in a prior iteration, the classifier can determine that this test should be bypassed (or replaced with another test) in a subsequent iteration.

Figure 2C:
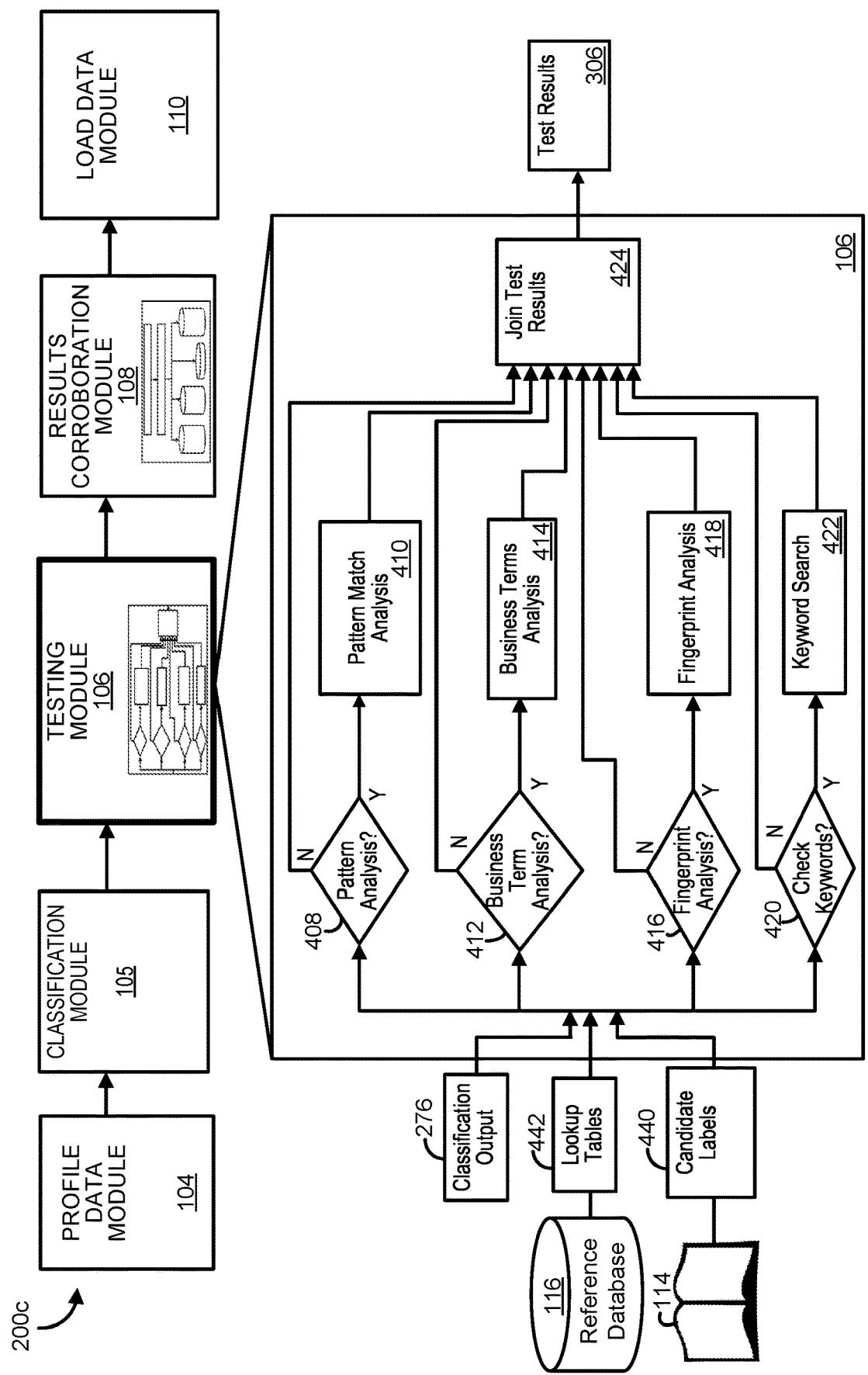

Turning to FIG. 2C, a process 200c for classifying the fields as being associated with semantic labels by the testing module 106 is shown. The testing module 106 is configured to classify the source data of the data set using the statistics in the profile data and using additional contextual information provided in the reference database 116 (such as lookup tables 442). The classification output 276 of the classification module 105 is used to provide the context of a data type for each field and to provide existing labels for the field (if any). The testing module 106 is configured to receive candidate labels 440 from the data dictionary database 114. The candidate labels are a library of existing labels, each associate with one or more attributes, that identify the semantic meaning of a data field (e.g., to a downstream application or a user). As previously stated, the attributes associated with each label in the data dictionary database 114 provide the semantic meaning of the label. The testing module 106 determines which of those candidate labels is the most closely associated with the attributes of the data fields determined by the data profile, the field names, and the data values of the fields.

The testing module 106 includes a plurality of tests (or classifiers), each executed by a different testing module, for associating one or more labels with each field being tested. For example, after fields of the data set are discovered by the profile data module 104, the testing modules determine how closely the attributes of the field correspond to the attributes of each of the candidate labels. Each test uses different data and approaches to propose one or more labels. Because the different tests use different approaches for classification, the proposed labels from each test may not necessarily be the same. The proposed labels are corroborated in the results corroboration module 108, subsequently described. The use of different tests to identify the semantic meaning of the fields results in a much more robust determination of the semantic meaning than using any single test because no single factor (e.g., a field name, or the inclusion of a particular value or set of values in the field, etc.) is relied upon as indicative of the semantic meaning for the field.

The testing of the data in each data field can include determinations of one or more of population levels of data of data sets (how often values occur in the data field), discovered data types (e.g., dates or numbers are held as strings), domains of the data field, discovery of key fields, determinations of whether fields are single words or description fields, and so forth. For example, the classification of the data can include date and time analysis. The testing module 106 thus receives the profile data from the profile data module 104 and performs a series of statistical-based functions to identify, classify, and test the field details against a set of known label types. The rules of the testing vary depending on the data type, which can be identified by the classification module 105 in the classification output 276, or in some cases be included in the profile data generated by the profile data module 104.

The testing module 106 is configured to perform a plurality of different classification tests on the field names and the entries in the data field to determine how to label the data field. The testing module 106 receives the classification output 276, the candidate labels 440, and the any reference data 442 from the reference database 116 and provides these data to the tests. The tests include a pattern analysis 410, a business term analysis 414, a fingerprint analysis 418, and a keyword search 422. As previously stated, while tables with field names and field data are described as an illustrative example, the tests 410, 414, 418, and 422 of the testing module 106 can be performed on other data types. Examples of classification tests that are executed against the data fields and data entries of the source data can include a fuzzy matching plan, a column data plan, a business term matching plan, keyword matching, a fingerprinting plan (e.g., contextual data lookup), pattern matching, and corroboration.

The fuzzy matching logic of the testing module 106 includes logic for fuzzy matching of field names from a dictionary of terms. Generally, fuzzy matching is configured to find a match between a field name and a term in the dictionary when an exact match cannot be found. The system finds dictionary terms that are less than exact. For example, the testing module 106 sets the threshold of the fuzzy match to a percentage value less than 100, and the dictionary database (e.g., database 116) will then return any matches in its memory corresponding to (e.g., greater than) that percentage. In some implementations, a probability score is assigned to each match. The probability score can be presented to the user.

The business term analysis 414 of the testing module 106 includes logic for matching a data field name to a business term that is known in a glossary of terms. Generally, the business term can be placed in different contexts or business term groups. The testing module 106 performs a check to find the occurrence of a particular word or term within another word or term. This can include references to a particular specification. For example, the testing module 106 receive a specification indicating different abbreviations for street names, such as "st", "ln", "ave", "pl", "ct", and so forth. The testing module 106 performs a check to determine whether any of those abbreviations is included within the data field. If one or more of the data elements of the specification are included in the data field, the testing module 106 determines that the data field includes street names. This piece of information can be used on its own, such as to determine that the data field includes street names and therefore should be labeled as such. This piece of information can also indicate that the data field includes other information, such as addresses. The testing module 106 uses the determination that there are street names in a column in addition to other data to determine whether the data field includes addresses, street names only, or some other data. In another example, the phrase "date of birth" could be recognized and associated with such a label. Other matching strategies can include matching using fuzzy matching, synonyms, etc. Generally, the testing module 106 associates a probability score with each match. The user can generate the specifications to configure this logic, such as through the development environment.

The pattern matching analysis 410 of the testing module 106 uses the data content of the fields (in addition to or instead of the field names). The types of pattern matching that are used for the pattern matching can be determined by the testing module 106 based on the results of the classification data 276. For example, the classification data 276 may identify a data type of a field, such as that the data are numerical. In this example, the profile data also indicates that each entry in the data field is 13-18 characters long. This may indicate to the testing module 106 that the data field may be a credit card number data field. To confirm this, one or more pattern tests can be executed by the testing module 106 against the data of the suspect data field. For example, the first 4-6 digits for each entry can be checked against a table of issuer codes. The last number can include a check digit defined by a Luhn test. If a threshold percentage of the entries for the data field satisfy each of these patterns, the testing module 106 can conclude that the field holds credit card numbers, and associate the field name with the appropriate label and probability. For the pattern matching logic, both the data itself of a given field and the patterns of the data in the field (e.g., identified in the profile data) can be used to discern which pattern tests to run and what labels to apply to the given data field.

The testing module 106 determines (408) whether to perform a pattern analysis test 410 on the source data 112. The determination can be a result of the classification data 276. The pattern match analysis 410 uses profile data to determine whether the source data 112 conforms to predetermined patterns that are indicative of a candidate field label. For example, if the data of a field has a particular length and composition, the pattern match analysis 410 identifies a corresponding candidate label. The pattern score applied to the label can be a function of how close a match the identified pattern is to the predetermined pattern, how distinctive the pattern is, or any number of factors. The weight can be adjusted as a function of the distinctiveness of the pattern. For example, a very unusual pattern may correspond to a higher weight value. If the values for a discovered field match the pattern closely (over all or a portion of the values), the score can be higher than if only a small number of values match the pattern.

The testing module 106 can include a keyword search test 422. The keyword test (which is similar to the business term matching test) includes data based tests including searches for particular keywords within data fields. For example, to find an address, the testing module 106 searches for common address words, such as "street", "road", "avenue", etc. The test can be extended by the user, who can add new keyword files to a specification of the reference database 116. The keyword tests can be used to find a word in a phrase or in part of a word, such as for addresses and company names in which there is a limited set of common words that can uniquely identify the data field.

The testing module 106 can determine (420) whether to perform a keyword analysis 422 on the field names. In this example, the testing module 106 would execute a keyword matching test if some of the fields still are not associated with label values. The field names (and possibly the field values) are checked for whether they include one or more keywords from a table, which may assist the testing module 106 in associating a particular label with the fields. The testing module 106 performs the keyword search 422 and generates a keyword search score.

The testing module 106 can include a fingerprinting test 418 for analyzing the data values of the source data. The logic of the fingerprinting generally includes a data lookup for data fields as a whole. Fingerprinting logic includes data value-based tests. The logic of fingerprinting data fields includes comparing a known list (e.g., from reference database 116) against the data of the data field to determine if the data of the data field correlates to the data of the list. For example, data from the data field can be compared to a list of first names, a list of state names, a list of city names, and so forth. The fingerprints (known data lists) are generally representative, rather than comprehensive. In other words, the fingerprint need not include each and every example of a value that is a part of the set of the fingerprint. Generally, the fingerprint can include selected example values representing approximately the most common values that should appear in the data entries of the data field. For example, the fingerprint does not need all possible first names in the U.S. for a first name table, but rather a selected group of the most popular names can be sufficient. For example, a top 100 names generally gives sufficient data for showing a correlation between the data field and the data fingerprint. The data fingerprints can be generated from master data. For example, a system might include the 50-100 most populous U.S. cities to check whether a data field corresponds to city names. A user can add new domains to a specification in order to increase the functionality of fingerprinting tests for a particular system.

The testing module 106 determines (416) whether to check fingerprint tables for the fields. Fingerprinting can work well in situations where there is a long list of possible values for a field, but a few of the values are expected to be more common than others. For example, city names, street names, and even first and last names are good candidates for fingerprinting analysis. The testing module 106 performs the fingerprint analysis 418 and generates a fingerprint score.

The testing module 106 determines (412) whether to run a business term analysis. A business term analysis can be useful when there are many unique terms in the source data 112 that may correspond to business terms for labeling the fields. If the business analysis is performed, the testing module 106 performs 414 a business terms analysis by comparing the field names to business terms to find matches and generate labels and their associated probabilities. The result of the business terms analysis 414 is associated with a weight and score, similar to the pattern match analysis 410.

The testing module 106 can be configured to compare results across tests to improve results using corroboration logic. For example, corroboration logic can be used to validate a business term match using another classification test. For example, a test specifying that a data field includes maiden name values should also pass a classification test of being a last name field.

The testing module 106 is configured to execute machine learning logic in which classifications of prior data sets (e.g., from a particular source) or of prior iterations of the same data set are remembered and influence which tests are selected for subsequent iterations and how the probability values of those subsequent iterations are determined. The machine learning logic is trained on the data set and can apply the weights that are developed using the training data to classify new data of the data set.

Each of the tests 410, 414, 418, and 422 can output one or more proposed labels for the data field being analyzed. The tests 410, 414, 418, and 422 need not be in agreement. Each proposed label can be associated with a score (not shown) and a weight value (not shown). The score and the weights for each label can be used by the results corroboration module 108 to suggest a particular label of the proposed labels as identifying the semantic meaning of the field and to categorize the label (or bucket the label) into a category. The category (subsequently described) indicates how much agreement there is among the tests and thus suggests a confidence of the proposed label as identifying the semantic meaning of the data for the field.

To execute the tests, the testing module 106 receives the data 276, 442, and 440 and determines whether each test is to be executed. For example, a test can be not executed if the type of data being received is not formatted for the particular test. Any combination of the tests can be executed. The testing module determines (408) whether to execute a pattern analysis 410, determines (412) whether to execute business term analysis 414, determines (416) whether to execute a fingerprint analysis 418, and determines (420) whether to execute a keyword search 422. Each test 410, 414, 418, and 422 generates one or more proposed labels and outputs the proposed labels. The tests results including all the proposed labels are joined (424) and sent to the results corroboration module 108 as test results 306.

In some implementations, subsequent tests can be performed if a result has not yet been found from the earlier tests. In some implementations, the testing module 106 prepares reference data by retrieving data from the reference database 116 based on the source data 112 being analyzed. For example, the testing module 106 can retrieve data from the reference database 116 based on a location of the source data 112, table names in the source data, user input, and so forth. The testing module 106 can determine which lookup tables are to be accessed and checked against each field of the source data. The choice of lookups can be performed based on the profile data received from the profile data module 104.

In some implementations, the testing module 106 determines whether to run a schema analysis. The schema analysis can be used to analyze the source data 112 over time and as a whole. For example, if fields are missing, added, deleted, and so forth, the information can be used for labeling other data fields.

In some implementations, once the tests have each been completed, the testing module 106 combines the associated scores to generate a final score, which is shown with the associated proposed label to which the score applies. In some implementations, upstream scores affect downstream scores, so that the scores are not distinct from one another, but represent a score that is updated as each analysis occurs. In some implementations, each proposed label and its score are separately reported to the results corroboration module 108, which then determines how to categorize the test results 306.

In some implementations, the order of the tests can be such that more processing-intensive tests are scheduled last. The more time-intensive tests can be a last resort if other tests fail. Ordering tests in this way can reduce processing time on the execution system 102 for labeling the source data 112.

Figure 2D:
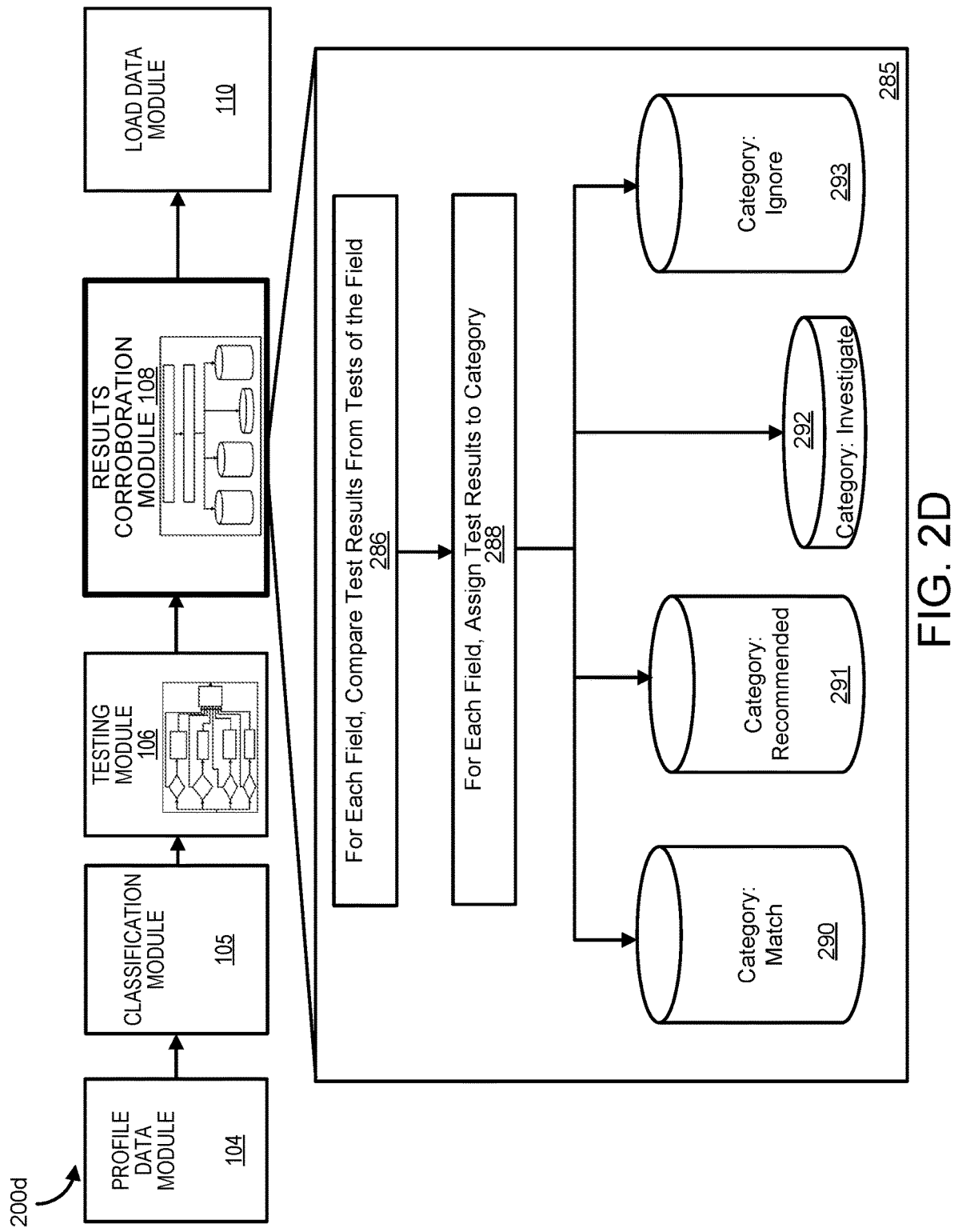

Turning to FIG. 2D, the results corroboration module 108 is configured to execute corroboration logic. Once the testing module 106 has run classification tests for the source data and determined probability values for labels of data fields of the source data, the results corroboration module 108 performs a check to determine whether the classified results are indicative of a high confidence or whether further testing should be performed.

The results corroboration module 108 receives the test results 306 of the different tests executed on the source data by the testing module 106 and determines whether the results corroborate or conflict with each other. The results 306 of the tests of the testing module 106 are sorted into several classification categories by the results corroboration module 108. The categories include a match category 290, a recommendation category 291, an investigate category 292, and an ignore category 293. Each of the categories is indicative of a similarity among the label proposals in the test results 306. For example, of all the label proposals are identical, the test results have a high level of similarity. If each label proposal is different, the test results have a low level of similarity. The similarity can be more than just a voting mechanism by each of the test. Each label proposals is associated with a weighted score value. If one label proposal of a test does not match the others, but is associated with a relatively high score value and a large weight compared to the other proposed labels of the other tests, then the similarity can be identified as being lower despite that three of four tests are in agreement.

Depending on the category identified, the results corroboration module 108 can either automatically validate the label as identifying the semantic meaning of the field or it can prompt a user to manually validate the label. Validation can be done through a client device on a user interface, as subsequently described.

The match category 290 is indicative of the highest level of confidence for a label (e.g., a 100 match). In some implementations, matched labels are automatically included in the metadata associated with the source data. However, the results corroboration module 108 can still be configured to present this result to a user for manual validation. Generally, a match categorization indicates that all the executed tests proposed the same label. In some implementations, the match category can be selected if the labels do not all match, but when any dissenting labels were below a score threshold, indicating general agreement among the tests.

The recommendation category 291 generally indicates that at least one label has a high quality association to the data field. However, the recommended label is generally below a threshold level set for a highest confidence, and further validation is preferred. In some implementations, a recommendation category is indicative of several high quality labels being associated with the data field. In some implementations, the results corroboration module 108 ranks and lists the recommended labels, each with a probability score, which can aid a user in selecting the best label(s) for the data field.

The investigate category 292 is indicative of a value or a data field having some interesting statistical property that does not pass any particular test. For example, the data field can appear as though it should have a meaning, but no tests have proposed labels, or they have or the proposed labels have scores below a given threshold. For example, the data field can include profile attributes indicating that the data field is a domain or field of significance in the source data, but no labels are recommended (or recommended above a threshold probability). Generally, such a result indicates that additional rules should be added to the tests (e.g., the tests should be extended or changed somehow) and performed again.

The ignore category 293 indicates that a data field is either designated as uninteresting or that the field triggered no tests and displayed no profile attributes suggesting that the data field is significant. Generally, the ignore category is shown when the data received have errors or have no discernable pattern. While the ignore category may indicate that a new label should be defined, it generally indicates that the field includes miscellaneous data that has no particular structure.

Generally, to categorize (e.g., bucket) the test results 306 into a category, the results corroboration module 108 performs a process 285. The results corroboration module 108 compares (286) the test results from the field. For each field, the results corroboration module assigns (288) the tests results 306 to a category based on the level of similarity.

In addition to generating a classification file specifying a classification category, the results corroboration module 108 is configured to generate other files. The other files include a profile comments file. The profile comments file is a file that describes the results of the classification analysis process. The other files include a discovery results summary, which describes the combined output form the business term matching process and the fingerprinting process.

The results corroboration module 108 is configured to determine whether there are outliers for data values based on aggregates and ranges for each data field. Outliers include data values that do not conform to an identified relationship or format for a data field. Results corroboration module 108 determines outliers are determined based on clustering and predictions of relationships from the classification of the testing module 106.

The processes described above can be iterated to increase the accuracies of the classifications and enable a user to update the classification tests to get better results. As stated previously, in some implementations, machine learning logic can be used to train classifier(s) during each iteration to facilitate this process. Generally, once the profile data is generated by the profile data module 104, the processes of the testing module 106 and the results corroboration module 108 are iterated; new profile data need not be repeatedly generated unless the source data itself is updated.

Figure 2E:
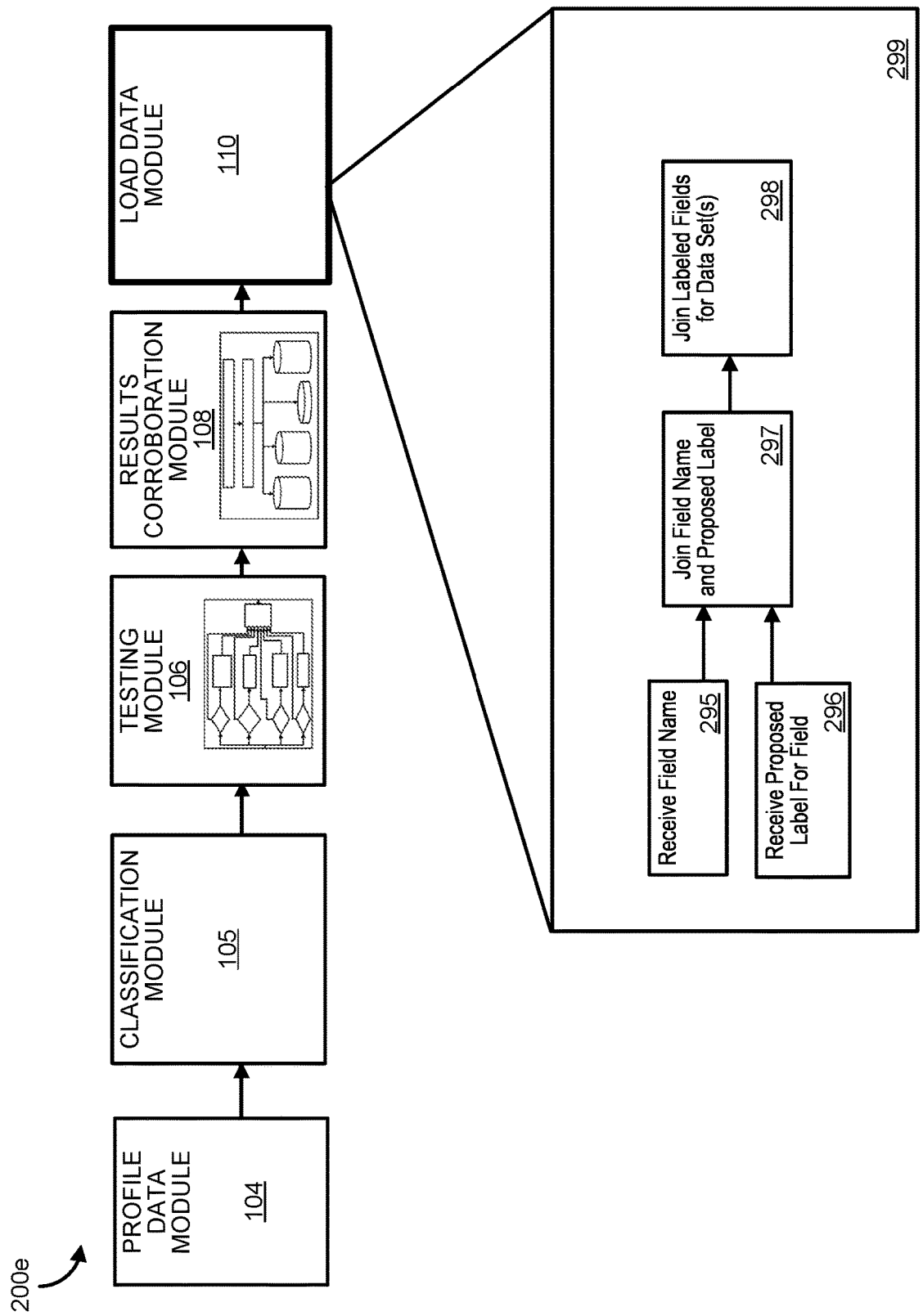

Once the profile data module 104, the classification module 105, the testing module 106, and the results corroboration module 108 have generated labels for each of the data fields, the load data module 110 can load the metadata including the label index into the reference database 116. Turning to FIG. 2E, the load data module 110 executes a process 299 for updating the label index and loading the data into the reference database 116. The load data module 110 receives (295) the field name and receives (296) the proposed label for the field, which has been validated either manually or automatically. The load data module 110 joins (297) the field name and the proposed label. The load data module updates the label index by associating the label with the field's location in the data set. The load data module joins (298) the labels for the data sets being analyzed into a label index that can be referenced for the data set by the execution system 202 and by downstream applications.

Generally the reference database 116 can be accessed by one or more downstream computing systems for various applications. For example, the generated labels of data sets can be used for data quality enforcement, personal data anonymization, data masking, (PII) reports, test data management, data set annotation, and so forth.

The load data module 110 is configured to package the metadata and the source data into a package that is usable by one or more other computing systems. For example, once the profile data is generated, the operations of the classification module 105, the testing module 106 and the results corroboration module 108 can be each configured to run multiple instances of their processes in parallel on different partitions of the source data. For example, if the source data includes a plurality of tables, the source data can be partitioned by table. The testing module 106 and the results corroboration module 108 can run instances of their logical processes on a plurality of tables concurrently to increase throughput of the processes of the execution system 102. Once the source data are labeled, the load data module 110 can be configured to merge the partitions back together and store the labeled source data in the reference database 116.

Figure 3A:
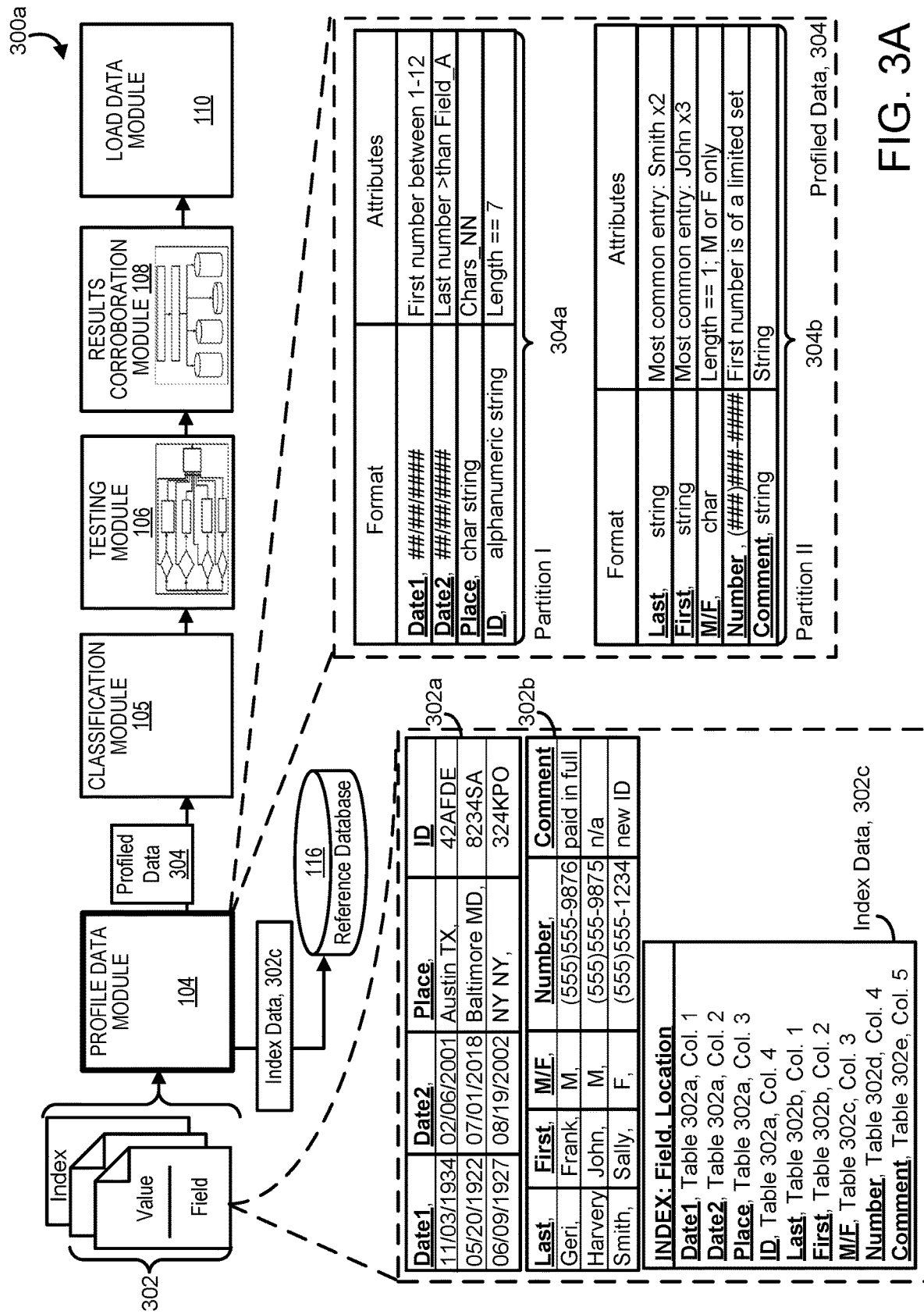
FIGS. 3A-3G are block diagrams of the process for profiling, classifying and labeling data fields to identify the semantic meaning of the data fields.

FIGS. 3A-3G are block diagrams of the process for profiling, classifying and labeling data fields to identify the semantic meaning of the data fields. In the example of FIG. 3A, a block diagram 300a shows that source data 302 is partitioned so that each table 302a, 302b is processed in parallel by the execution system 102. The source data 302 includes fields and values of entries in the fields. As previously discussed, while tables and fields are shown as examples of source data, the source data can include other types of data. The profile data module 104 receives the source data 302 and stores index data 302c in the reference database 116. The index data 302c can be an index of the tables for the source data 302. The index data 302c are later modified to include the labels for each of the fields in the source data 302 and thus becomes the label index. As shown in FIG. 3A, the index data 302c associates a field name with a field location in the source data 302 for each field.

The source data 302 includes two tables, table 302a and table 302b. The first table 302a includes dates, city names, and alpha-numeric codes. The second table 302b includes names, phone numbers, and dates. While it may be apparent to a user that the city names are indeed city names, or that the phone numbers are indeed phone numbers, it might be harder for user to determine the purpose of the alphanumeric codes or determine what the dates are representing. The execution system 102 is configured to solve this issue by classifying each of the fields of the first and second tables 302a, 302b as described previously.

Generally, the profile data module 104 first profiles all the tables of the source data 302 to determine statistical characteristics about the tables. Once the profile data 304a, 304b has been generated for each of tables 302a, 302b, respectively, the execution system 102 partitions the first table 302a into a first partition 304a and the second table 302b into a second partition 304b.

As previously discussed, the profile data 304 includes statistical information about the field names and the entries of each of the fields. For example, for table 302a, the profile data 304a identifies four fields: Date1, Date2, Place, and ID. The profile data module 104 has determined that the data values (also called entries) of Date1 include the same format: ##/##/####. In practice, the profile data module 104 can determine that nearly all the values have this format, and discard outliers. In addition to determining a format of the values of Date1, the profile data module 104 determined that the values of Date1 all fall within 1-12 for the first two digits. This data can indicate to the testing module 106 that the values of the entries for Date1 are dates.

Similarly, the profile data module 104 performs a format analysis and a statistical analysis on each of the fields Date2, Place, and ID. Date2 also has a ##/##/####format for its entries. The profile data module 104 has also determined that the values of the last four-digit portion of Date2 are always greater than the corresponding values of the las four-digit portion of the entries of Date1. This indicates that, if both Date1 and Date2 include dates, that the date values of Date2 are always later in time than the corresponding date values of Date1 for each entry in the table 302a. The profile data module 104 determines that Place is a character string in which a two-character code always follows a first word. The profile data module 104 determines that ID always includes an alphanumeric string of length 7, which may provide clues to the testing module 106 that the value of ID is a code, user ID, etc.

The profile data module 104 also profiles table 302b to generate profile data 302b. Generally, the tables 302a, 302b are profiled together before partitioning occurs. The profile data module 104 determines that Last of table 302b includes a string, and that the value of "Smith" is the most common entry (x2). The profile data module 104 determines that First of table 302b includes a string, and that the value of "John" is the most common entry (x3). The profile data module 104 determines that M/F includes a single character that is one of two values: "M" or "F." The profile data module 104 determines that the format of Number includes (###) ###-####, and that the numbers within the parentheses (or the first three numbers) are from a limited set. The profile data module 104 determines that Comment includes a string, and that the first two digits are between 1 and 12.

The profile data 304, once generated by the profile data module 104, is send to the testing module 106. The testing module 106 is configured to operate on the tables in parallel in partitions 306a and 306b. The profile data module 104 sends profile data 304 to the classification module 105.

Figure 3B:
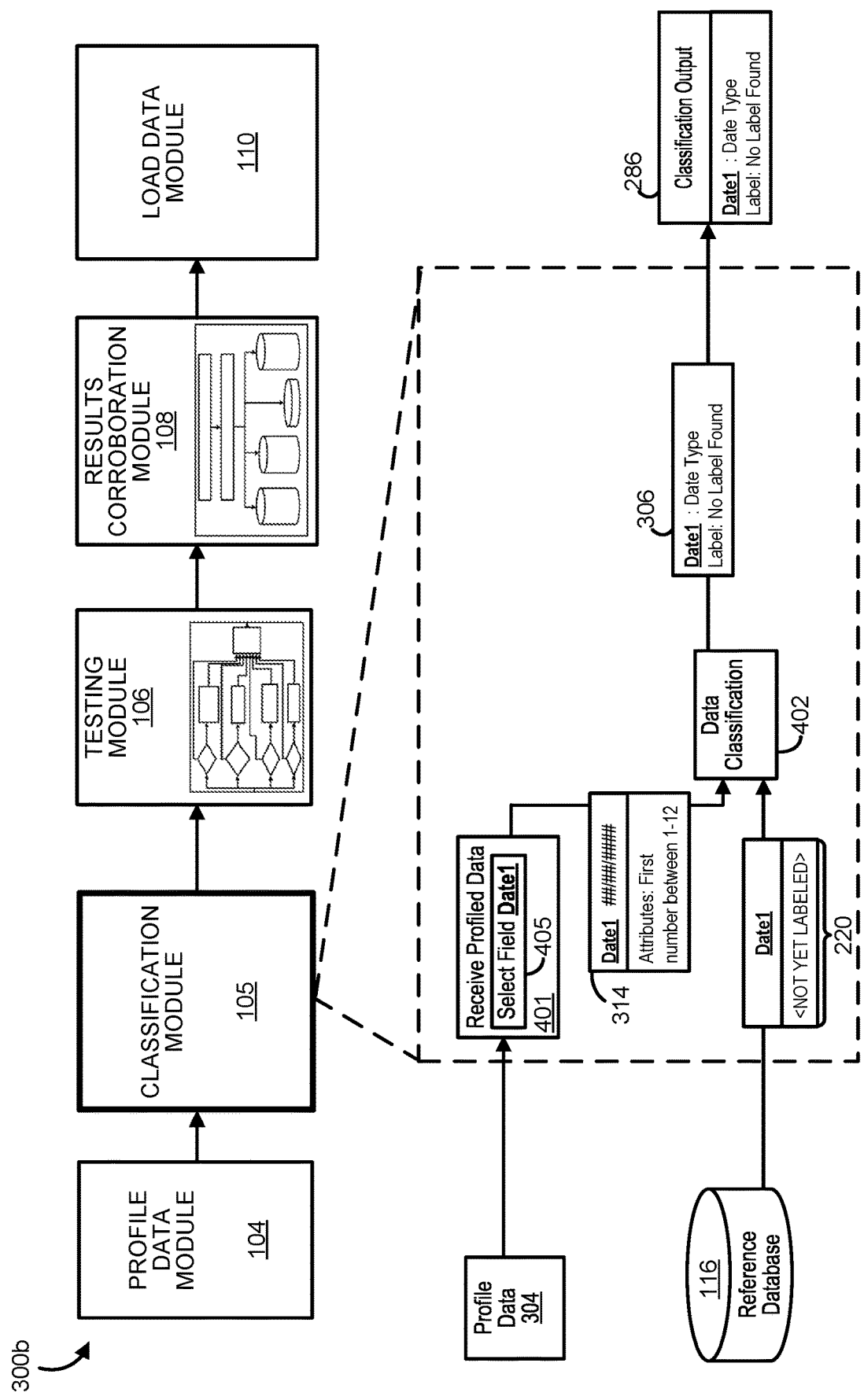

Turning to FIG. 3B, a block diagram 300b shows how the classification module 105 processes the profile data 304 and the source data 302 for classifying the type of data for each field. The classification module 105 receives (401) the profile data 304 from the profile data module 104 and the label index 220 from the reference database 116. The classification module 105 selects (405) a field from the source data. In this example, field Date1 is selected for classification. The classification is performed on a field-by-field basis for the source data 302. The profile data 314 for the selected field are classified based on whether there is an existing label for the field. Here, a status of field Date1 is shown as <NOT YET LABELED>. The classification module 105 classifies the field Date1 to determine that the field is a date field, and indicates any labels for the field (none are found in this case). These information is the classification output 286 that is sent to the testing module 106.

Figure 3C:
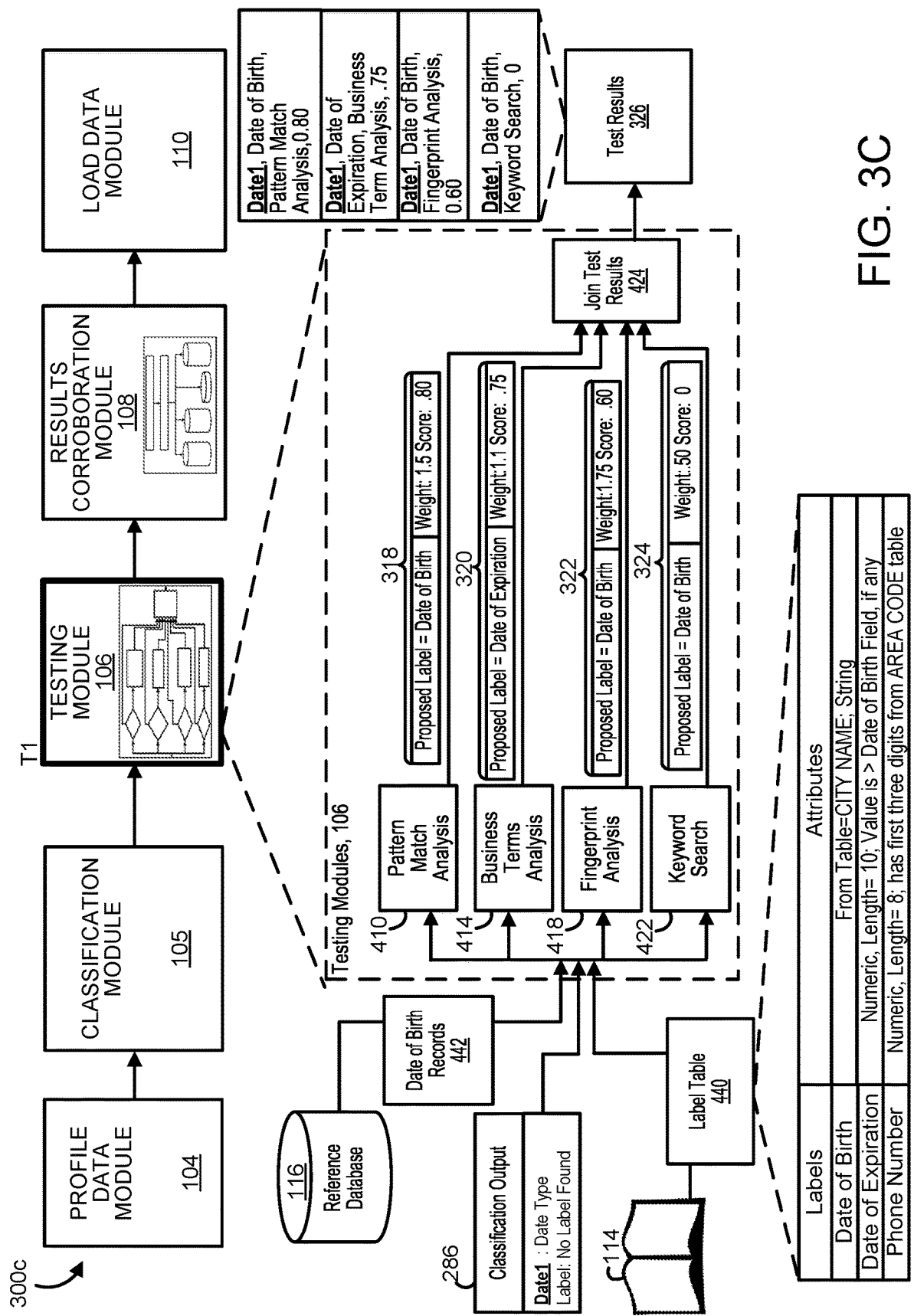

Turning to FIG. 3C, a diagram 300c shows how the testing module 106 proposes label(s) for the field Date1. This diagram 300c shows testing for a single field of the data set at a first time T1. Testing is performed on field-by-field basis, but generally all fields are tested for the data set. The testing module 106 generates classification outputs 306 by using the clues provided by the classification output 286, the profile data 304, and data stored in the reference database 116 including a lookup table 442. For example, as previously described, the classification module 105 determines from the format of Date1 of table 302a that the first field is a "date" field. The additional information that the first portion is a number between 1-12 (and that the system uses U.S. date notation) further suggests that Date1 is a date field. The testing module 106 assigns a probability that Date1 is a date field of 95. However, with no further context, the testing module 106 cannot determine what kind of date the date field is representing. The date field of Date1 could include a date of signing up for a service, a date of birth, a renewal date, and so forth. The testing module can determine that the Date1 field is a "Date of Birth" field because the tests use the contextual information of the reference database 116 and the label table 440. The label table 440 includes the list of defined labels for the data set being analyzed. The label table 440 can be amended as needed to add additional labels, as previously described. As shown in FIG. 3C, each label of the label table 440 as one or more attributes which describe what features there are for the data that the label should be describing. For example, a valid phone number has the first three digits from a set of possible numbers in an areas codes table in the reference database. For example, a date for the Date of Expiration field will always be later than the date in the Date of Birth field (if one exists). These attributes, which indicate complex relationships among field values and other features of the data, indicate that the data have the semantic meaning identified by the associated label.

To test the field Date1, the testing module 106 performs the tests 410, 414, 418, and 422 in any combination as previously described. One or more labels are proposed by each test. For example, the pattern match analysis 410 proposes a Date of Birth label proposal 318 with a score of 0.80 and a weight of 1.5. For example, the business term analysis 414 proposes a Date of Expiration label proposal 320 with a score of 0.75 and a weight of 1.1. For example, the fingerprint analysis 418 proposes a Date of Birth label proposal 322 with a score of 0.60 and a weight of 1.75. For example, the keyword search analysis 422 proposes a Date of Birth label proposal 324 with a score of 0 and a weight of 0.5. The weights can be predetermined based on feedback applied to the execution system 102 by the user or can be automatically adjusted by a machine learning process. The scores indicate how strong the proposal is by a test. For example, the score of 0 for the keyword search test 422 can be given because the available data are not properly formatted for such an analysis to be used. Therefore, the proposal for this test is discarded in this case. A score of 1, for example, indicates a high confidence for the test that the proposed label is correct. For example, if all the attributes for a particular label in the label table 440 are identified in the source data 302 and the profile data 304 for the field Date1, the test can be certain that the particular label accurately identifies the semantic meaning of the field.

The testing module 106 joins 424 the label proposals 318, 320, 322, and 324 into test results 326. The test results 326 include the labels that are proposed and their associated scores and weights. The results corroboration module 108 uses the scores and weights to determine how similar the label proposals are to each other for categorizing the proposal into a category.

Figure 3D:
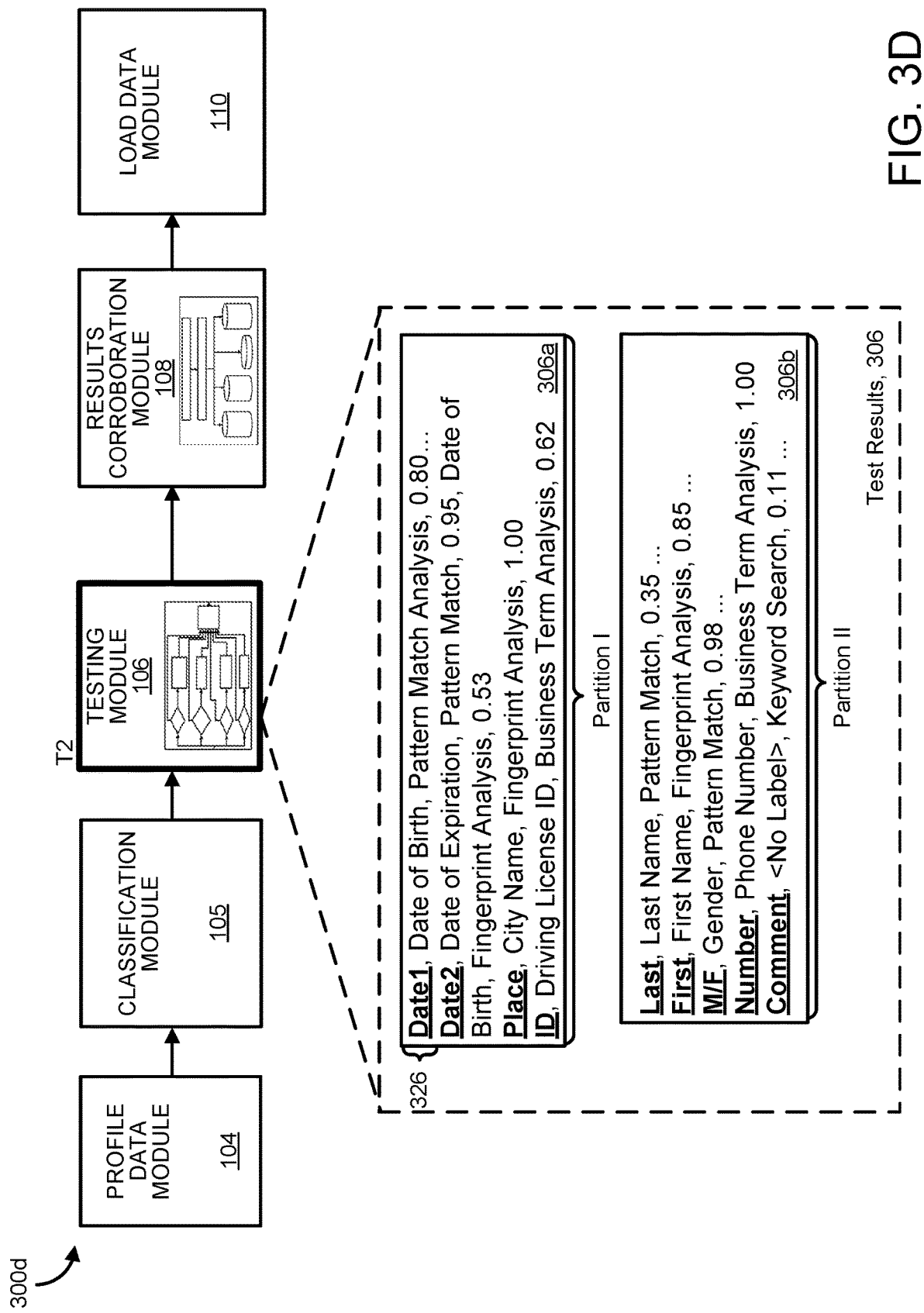

Turning to FIG. 3D, diagram 300d shows a second time T2 after which each of the fields of the source data have been tested. Test results 326 are shown for Date1, and these are joined with other test results for other fields. For example, the testing module 106 determines that Date2 is a Date of Expiration with a 95 score, similar to the determination that Date1 is a Date of Birth. The testing module 106 has additional context that this date is always after the date value of Date1 for each entry. Additional information can be accessed to further define the date. In this example, the test proposes "Date of Expiration" as a potential field name. The testing module 106 assigns a score of 53 to Date2 for the label of "Date of Birth" based on a fingerprint analysis.

The testing module 106 performs a lookup based on the values in the entries of Place. As previously described, the testing module 106 can use lookup tables, keyword matching, fuzzy matching logic, etc. to determine that the values of the character string are city names, and that the two-letter strings in each entry represent state abbreviations. In some implementations, the testing module 106 is configured to dissect the two portions of each value of the entries of Place to determine that the entry values represent both city and state names.

The testing module 106 refers to a particular lookup table provided for this source data 302 by a system administrator. Because this system is ingesting data from a motor vehicles department, one of the tables that is included by the user is a Driving License ID table. The testing module 106 can determine that the formats of the values of ID match the formats of the Driving License IDs that are in the lookup table. In this case, a fingerprinting algorithm is applied. While some matches are found between ID and the lookup table values, in this example there are only a few matches. The testing module 106 assigns a corresponding score of 62 to this label. A subsequent iteration in this example could provide additional values for the fingerprinting algorithm to get a stronger match. However, in other examples, the fingerprinting algorithm can provide a high-confidence match on a first attempt.

In parallel to analysis of table 302a in partition 306a, the testing module 106 is configured to analyze the profile data for and content of table 302b in partition 306b. In this example, the testing module 106 applies one or more classifiers to Last of table 302b to determine that the field represents last names. For example, the classification algorithms described previously can be applied to the data of the table 302b. Because the most common value ("Smith") only occurs twice, the testing module 106 assigns the field a label of "Last Name" with a low score of 35. However, for First, based on a similar analysis of a lookup table, because the name "John" occurs more frequently (and is identified as a first name value), the first name score is 85.

The testing module 106 performs a check against single character codes for the values of M/F of table 302b. A gender designation table is found, and the values of M/F match those specified in the table. M/F is assigned a label of "Gender" with a 98 score.

For Number, the testing module 106 determines that the format of each entry (or most entries) corresponds to a phone number. As a second check, the first three digits are compared to an area codes table. Because the first three digits of each value of Number match values in the area codes table (not shown), the testing module 106 assigns a label of "phone number" to Number with a 100 score. For Comment, the testing module 106 determines that no test has found a likely label. The test results 306 can be kept in partitions 306a, 306b based on the tables being analyzed.

Figure 3E:
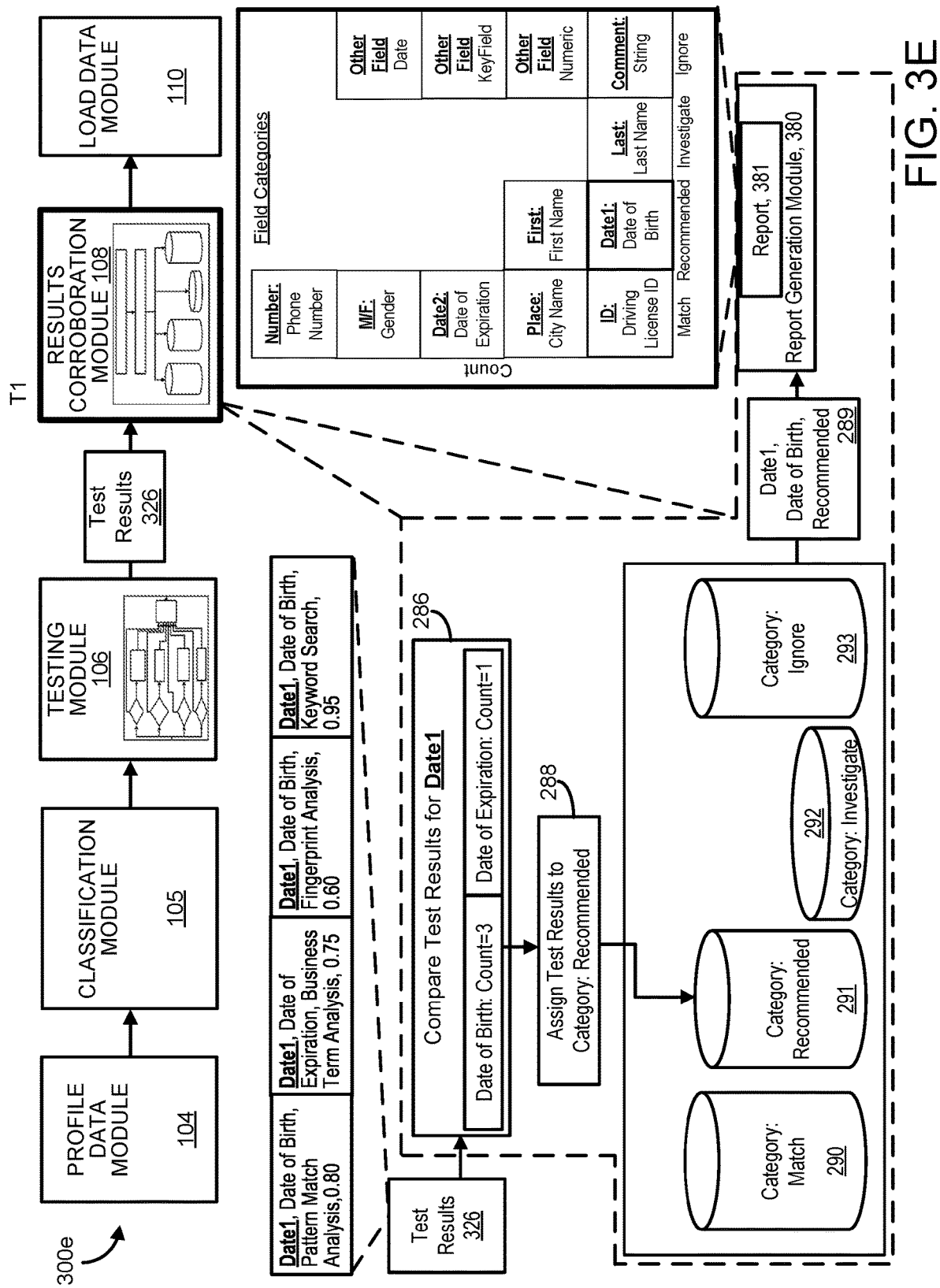

Turning to FIG. 3E, the diagram 300e shows how the results corroboration module 108 processes the test results 326 for the field Date 1. FIG. 3E shows a time T1 for processing the particular field Date 1, as each field is categorized on a field-by-field basis. The results corroboration module 108 receives, the test results 326 for field Date1.

The results corroboration module 308 compares the label proposals of the test results 326 to one another at module 286. The data of birth label proposal has a count of 3, while the date of expiration label proposal has a count of 1. In some implementations, a simple voting mechanism can be used to determine which label(s) should be shown to the user as the final label proposed for identifying the semantic meaning of a field such as Date1. In some implementations, the scores and weights can be used to determine which label is proposed and what category is associated with the proposed label. For example, the results corroboration module 108 can rank the proposed labels by their weighted scores and select the highest ranked proposed label. In some implementations, all proposed labels are shown to the user for validation (if more than one is proposed).

The results corroboration module 108 assigns the proposed label to a category based on the similarity among the proposed labels by module 288. The category can be selected based on the weight scores, counts for each proposed label, and so forth. A function of the counts, scores, and weights can be used to assign the label proposal(s) for a field to one of the categories 290, 291, 292, or 293. Here, because the proposed labels are not unanimous among the tests, and because the dissenting test is associated with a high enough weighted score value, the recommended category 291 is chosen (rather than the match category 290). The results corroboration module will likely prompt a user to validate the categorized proposal 289.

A report generation module 380 can generate a report 381 showing how each of the fields is categorized and with what label proposals. For example, a histogram is shown including a count for each category and which fields and proposed labels are in each category. Generally, a low number of fields need to be investigated, while a high number of fields have recommended proposals or matched proposals.

Figure 3F:
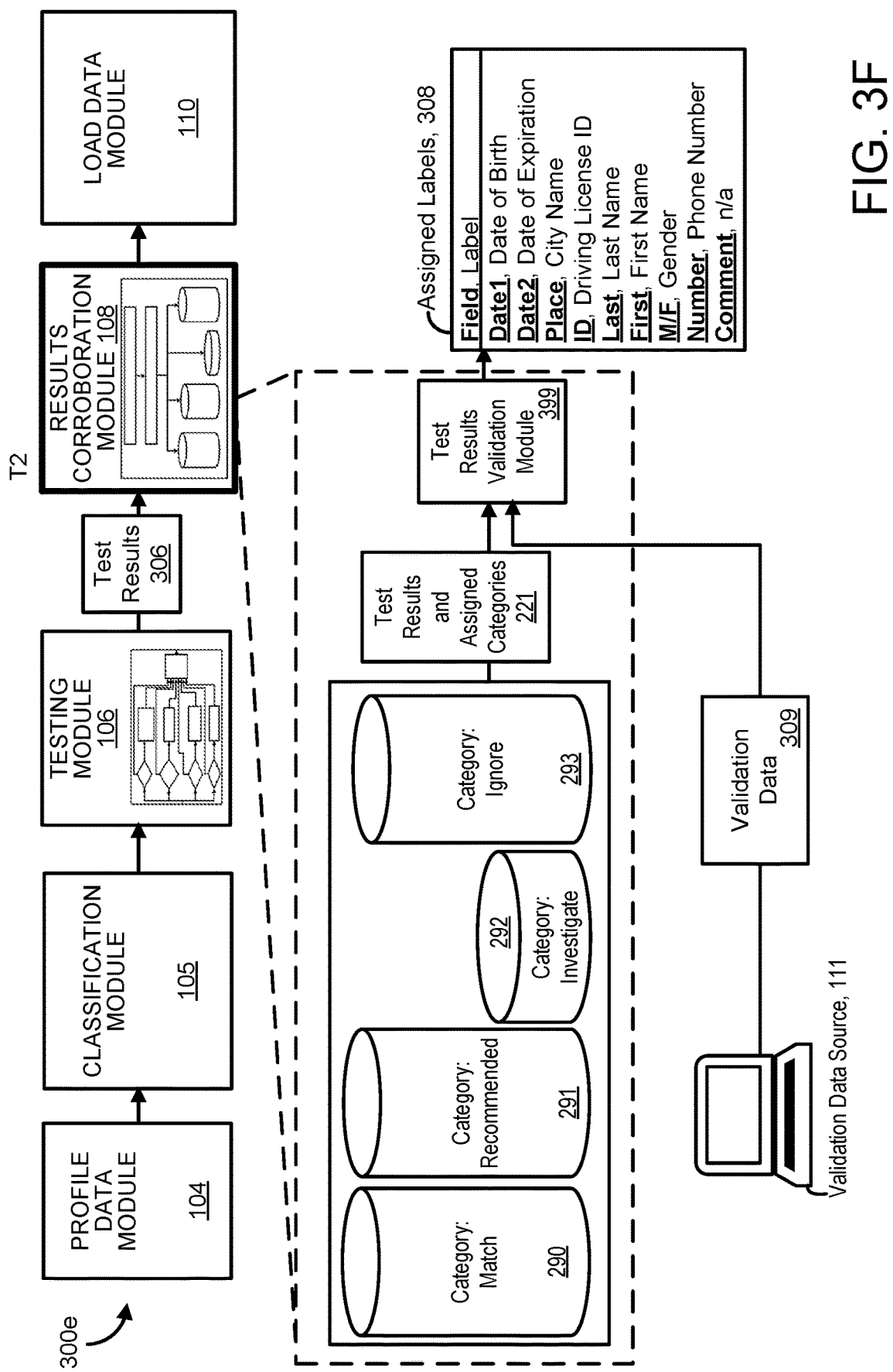

Turning to FIG. 3F, block diagram 300e shows a time T2 for the results corroboration module after all the fields have associated categorized label proposals. The test results and assigned categories 221 are sent to a test results validation module 399. The validation module 399 can cause presentation of a user interface to a user, such as on a validation data source 111 (e.g., a client device). Validation data 309 are received via the source 111, and the validated labels are assigned to the fields as assigned labels 308. Each field is associated with one assigned label identifying the semantic meaning of the data of the field.

Figure 3G:
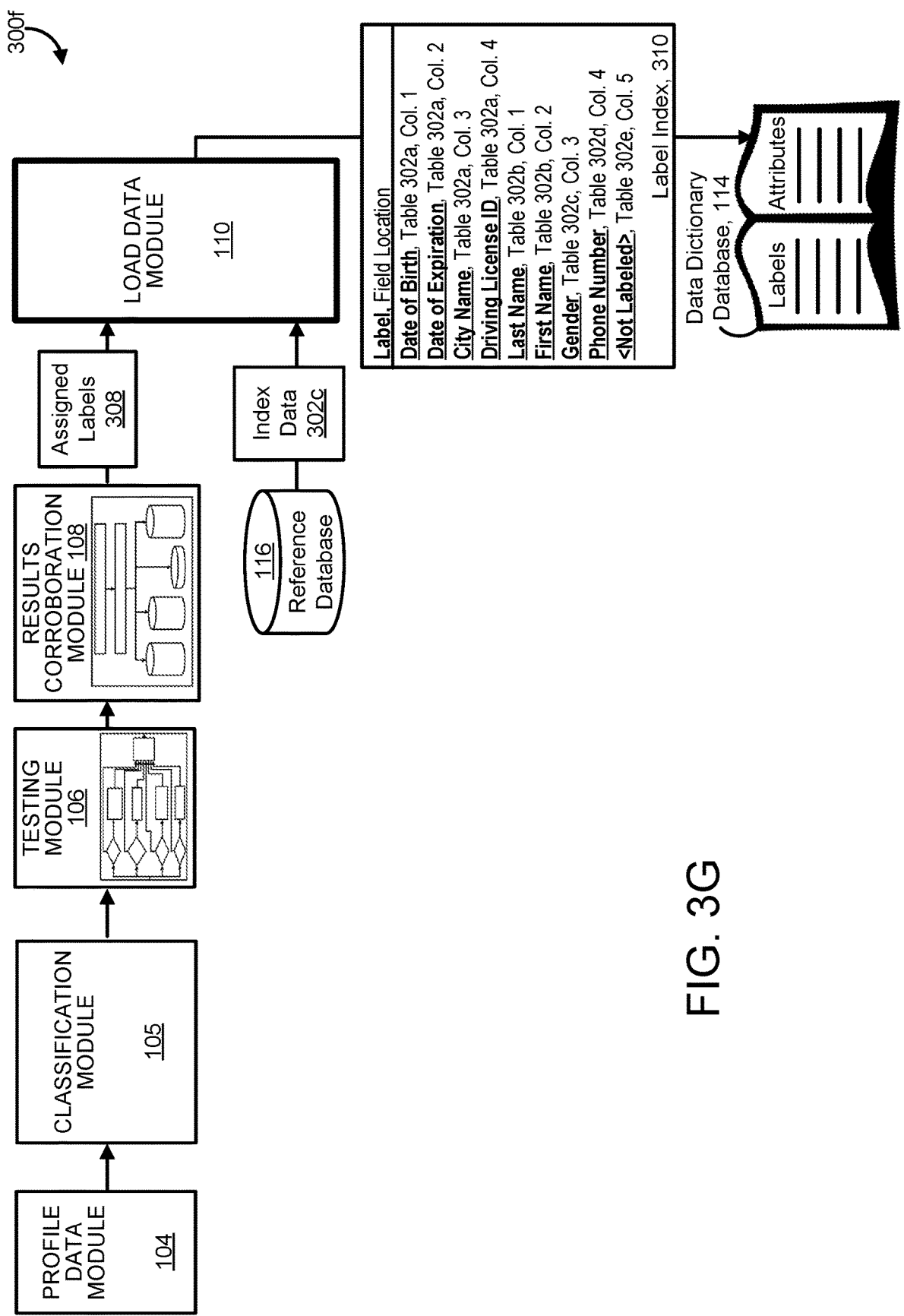

Turning to FIG. 3G, diagram 330f shows how the assigned labels 308 for the fields of the source data 302 are stored by the load data module 110 and how the label index is updated/generated. The load data module 110 receives the index data 302c from the reference database 116. The index 302c is used to generate, for each label in the data dictionary database 114, a location of every field assigned that label. The label index 310 shows this association. When downstream applications manipulate the source data 302, the label index can be referenced 310 to reduce errors in data handling and quickly look up the semantic meaning for a given field without having to analyze the data further. This makes it possible for downstream applications to screen personally identifying data, for example, without actually accessing the data itself.

Figure 4:
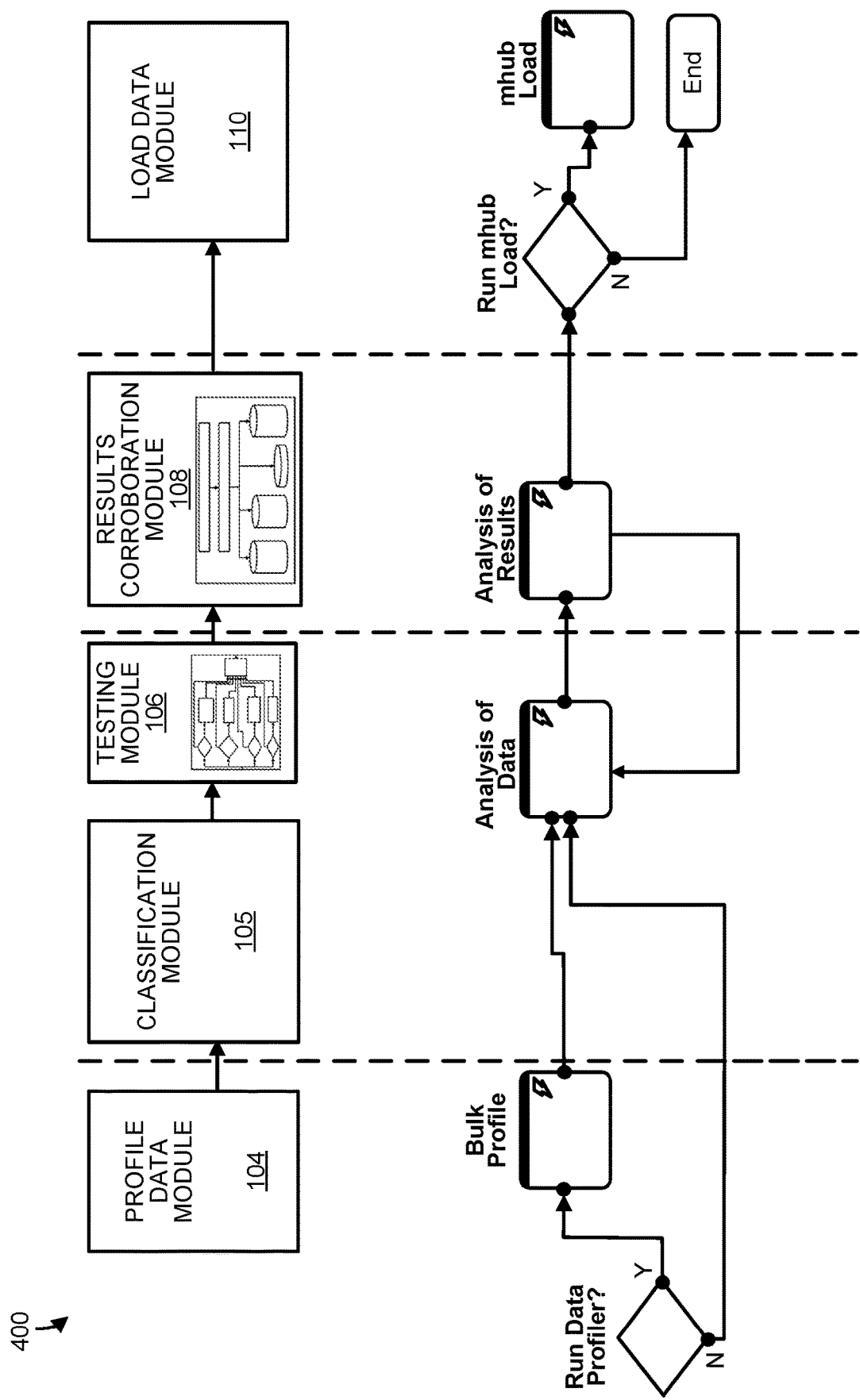
FIG. 4 is a flow diagram showing operations performed by logic engines of the execution system for discovering, classifying and labeling data fields by analyzing a data profile generated from data of the data fields.

FIG. 4 is a flow diagram 400 showing operations performed by logic engines of the execution system for discovering, classifying and labeling data fields by analyzing a data profile generated from data of the data fields. As previously described, once an analysis has been performed by the results corroboration module 108, the analysis can be repeated if the results are inconclusive.

Figure 5:
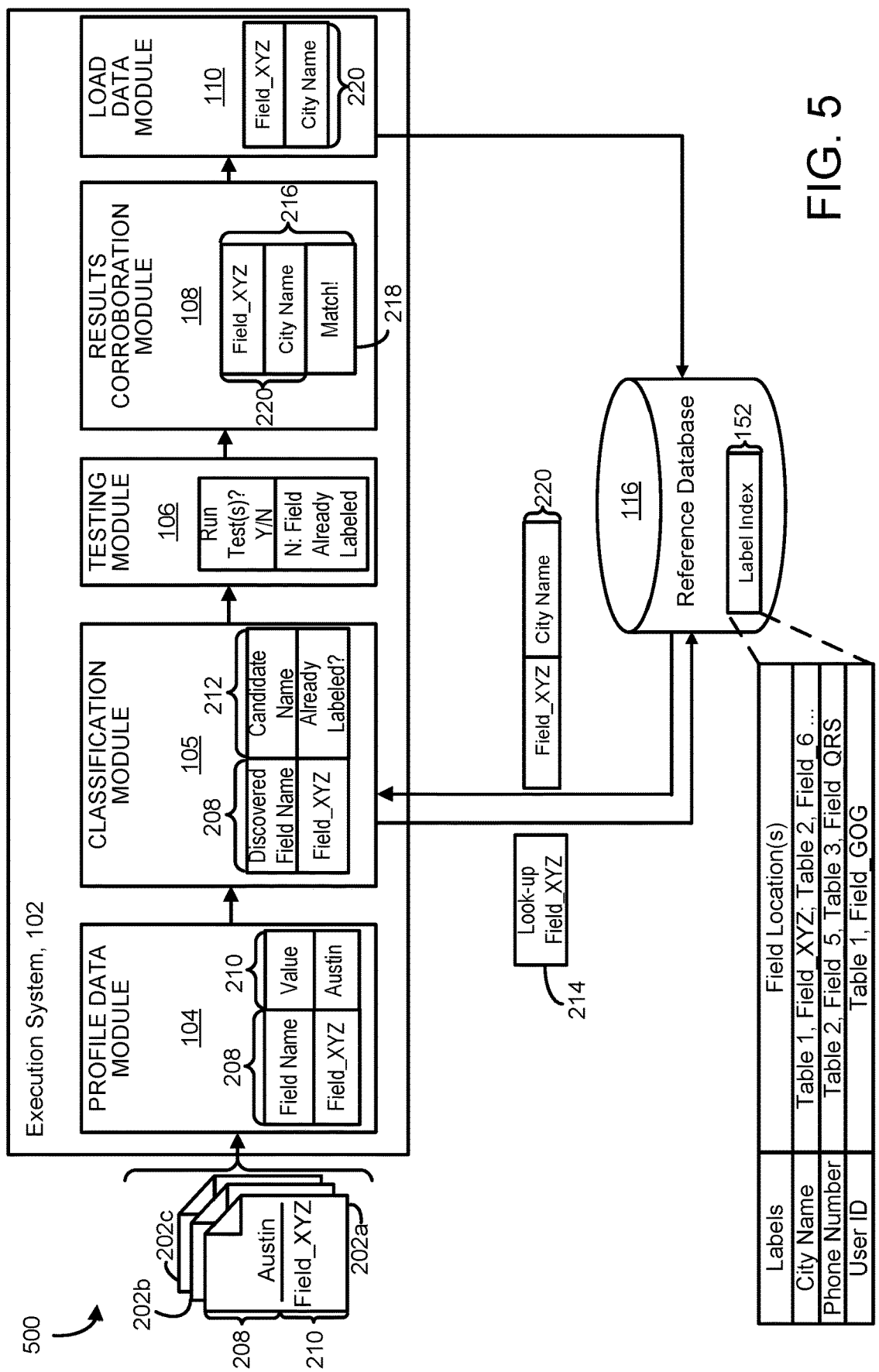
FIG. 5 is a block diagram of the process for profiling, classifying and labeling data fields to identify the semantic meaning of the data fields.

FIG. 5 shows a block diagram of the execution system 102 for discovering, classifying and labeling data fields by analyzing a data profile generated from data of the data fields is shown. The execution system 102 is shown in an example environment 500 in which a particular field 208 is being labeled from source data 202 including fields 202a, 202b, and 202c. In this example, the extensibility of the system is shown, as a label has already been associated with field 208.

In the example of FIG. 5, the source data 202 includes a field 208 called "Field_XYZ," which is a technical field name. The execution system 102 is configured to receive the source data 202 and label the field 208 with a business term that represents what kinds of values are stored in the field. The field 208 includes data entries, such as data entry 210 which includes the string "Austin TX."

The profile data module 104 is configured to receive the source data 202 and generate profile data from the source data. While this example is constrained to a particular data entry, the source data 202 typically includes many entries. Generally, the entries can be scanned for statistical information. Once the profile data are generated for a field (or generally, a table), the testing module 106 performs one or more classification tests, as described previously. The classification 106 can reference the reference database 116 to determine whether the field name "Field_XYZ" already has a label. In this example, a direct lookup result is found in a label index 154. The field name "Field_XYZ" is known (e.g., by a specification generated by a user or by some other means) to represent the field name of "City Name." Because this relationship is explicitly defined in the index 154, the testing module 106 can score the relationship with a high confidence or pass the result to the results corroboration module 108. The testing module 106 can use the knowledge of what a "City Name" might be to make further determinations as to what value is included in the value 210.

The labels that are identified by the testing module 106 are sent to the results corroboration module 108. The results corroboration module 108 categorizes the label in to a category "match" 218, determines whether the label should be automatically applied, and requests validation if needed. The results corroboration module 108 corroborates the different classification tests as previously described to output a ranked list of recommendations for labeling the field 208. Once the label 220 is validated, the assigned label is sent to update the index table 152 if needed. In some implementations, the attributes of the label City Name can be updated based on the attributes of field 208.

Figure 6A:
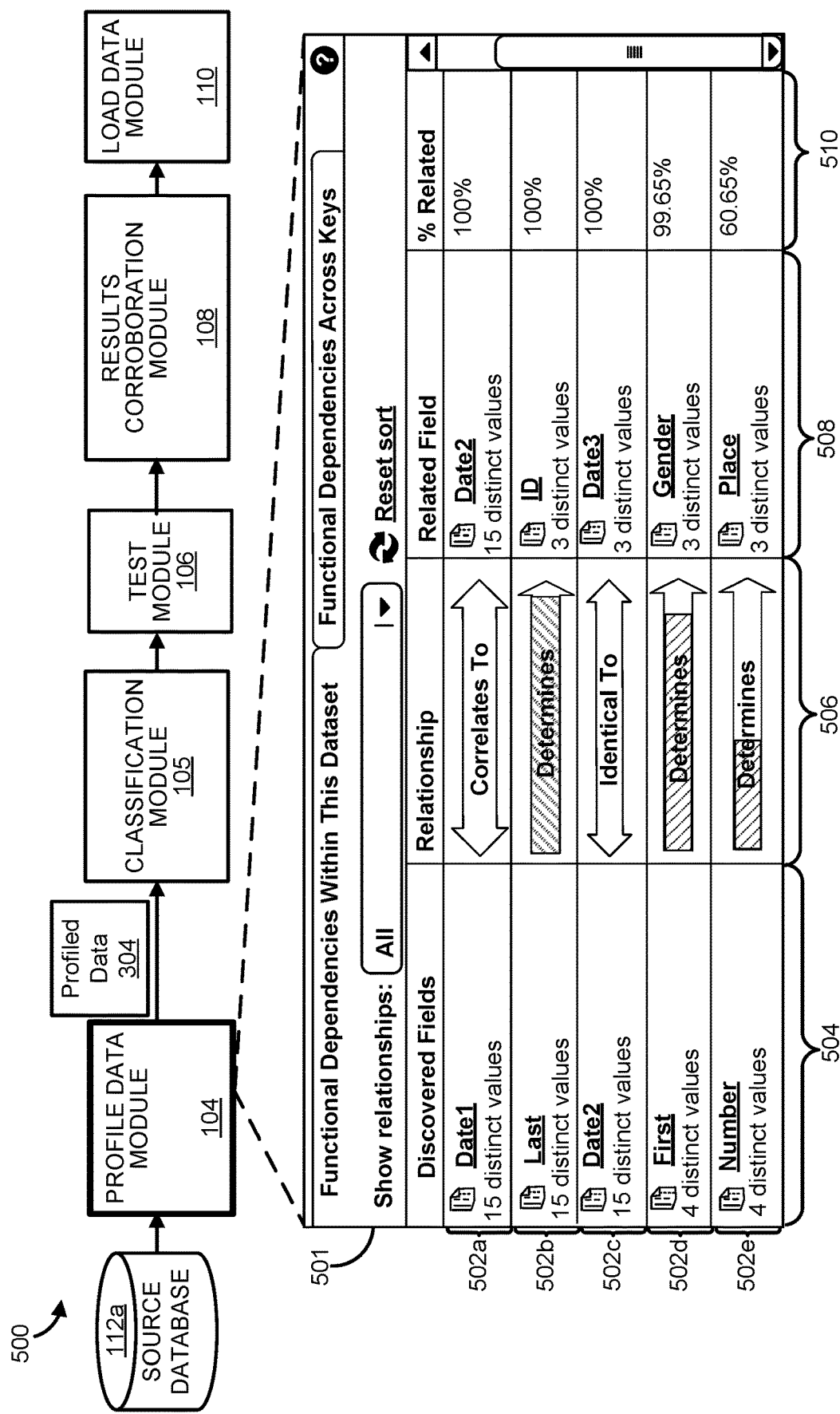
FIG. 6A is a depiction of a user interface showing results of a data profiling process.

Turning to FIG. 6A, a depiction is shown of a user interface 500 showing results of a data profile process, such as by profile data module 104. The user interface 500 includes a header 501 and rows 502a-e and columns 504, 506, 508, and 510. Each of the rows 502a-e represents a field of the source data 112. In some implementations, different rows represent the same field (such as rows 502a and 502b), but each row shows a different detected relationships between the field and other fields. For example, row 502a shows that the field "Date1" correlates to the field "Date2," while row 502b shows that field "Last" determines field "ID."

Column 504 shows each of the fields of the source data 112. Column 506 shows the kind of relationship that is detected between the field and a related field of the source data 112, shown in column 508. Column 510 includes the confidence score (e.g., probability) that the fields of columns 504 and 508 are related to one another as indicated in column 506.

The relationships that are detected in the source data can be used by the testing module 106 to determine label values for each of the fields. For example, determining that a zip code field is related to a state field can provide clues as to what each field means in practical terms. This is useful if names of the fields are technical or otherwise do not indicate the type of data that are included in the fields.

Figure 6B:
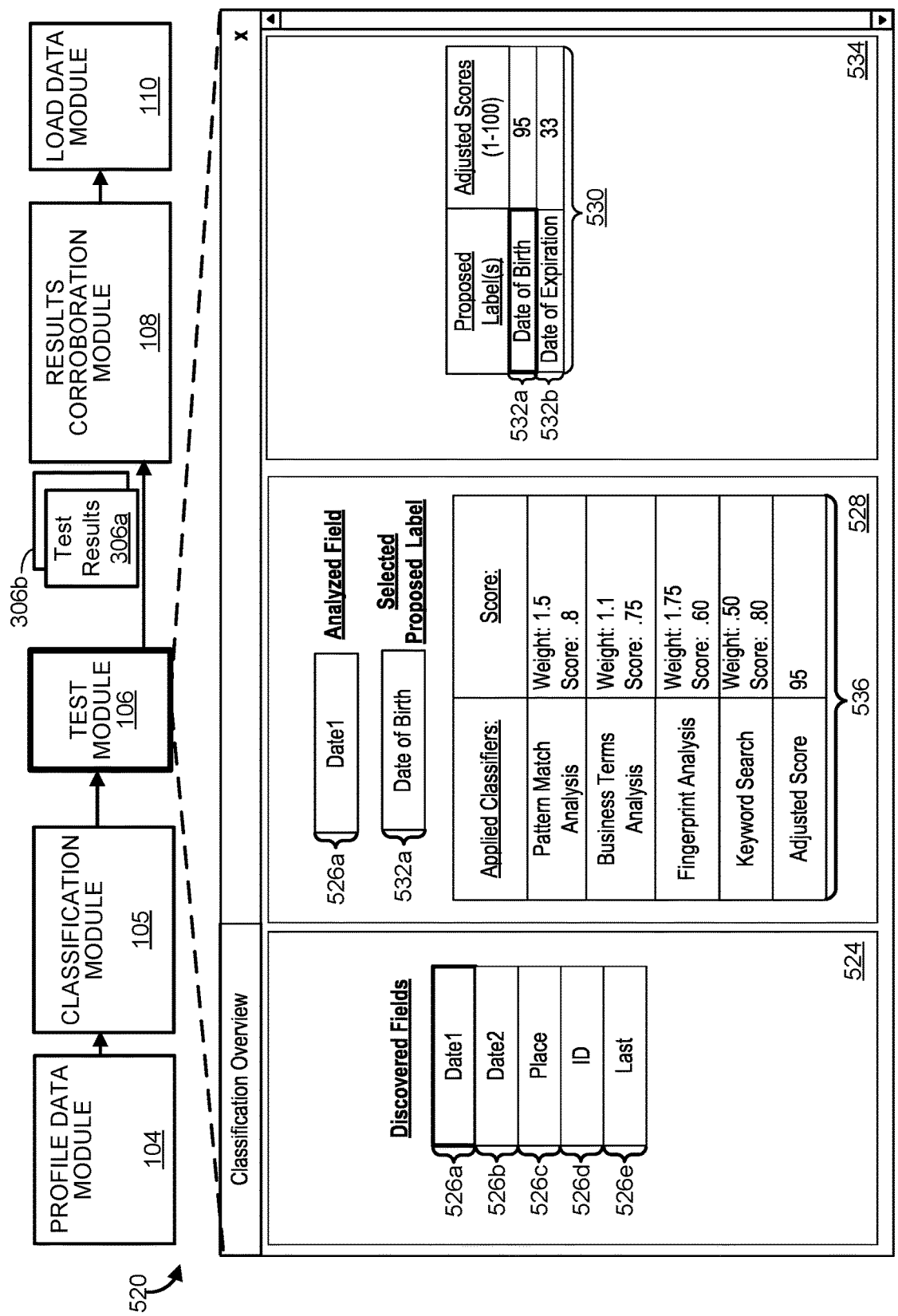
FIG. 6B is a depiction of a user interface showing results of a classification process.

Turning to FIG. 6B, a depiction is shown of a user interface 520 including results of a classification process of the testing module 106. A window 524 shows discovered fields 526a-e list. In this example, fields from columns 504 and 508 of FIG. 6A are included. Box 526a shows which fields have been analyzed by the testing module 106. In this example, field "Date1" has been analyzed. In some implementations, each field can be selected to show details about how the testing module 106 analyzes that discovered field and how the score is generated. For example, the bold outline of button 526a shows that this button has been selected.

Window 528 shows details of the analysis of the selected discovered field of window 524. Here, window 528 shows that four classifier tests are applied: pattern match analysis, business terms analysis, fingerprint analysis, and keyword search. Each test is associated with a corresponding weighted score. The final, adjusted score is also shown in box 536.

Window 534 shows a list 530 of candidate labels and their adjusted scores. Here, the label "Date of Birth" is associated with a score of 95. A second label, "Date of Expiration," is associated with a score of 33. While the candidate labels are shown as ranked according to their scores, the candidate labels can be shown in any order. The score of 95 matches the adjusted score shown in window 528. The analysis performed and scores shown in window 528 are associated with the candidate label 532*a* "Date of Birth."

Window 534 shows additional details about the classification process of the testing module 106. For the number of proposed labels can be shown. In this example, the number is 2. In another example, a number of iterations for analyzing one or more of the discovered fields can be shown.

Figure 6C:
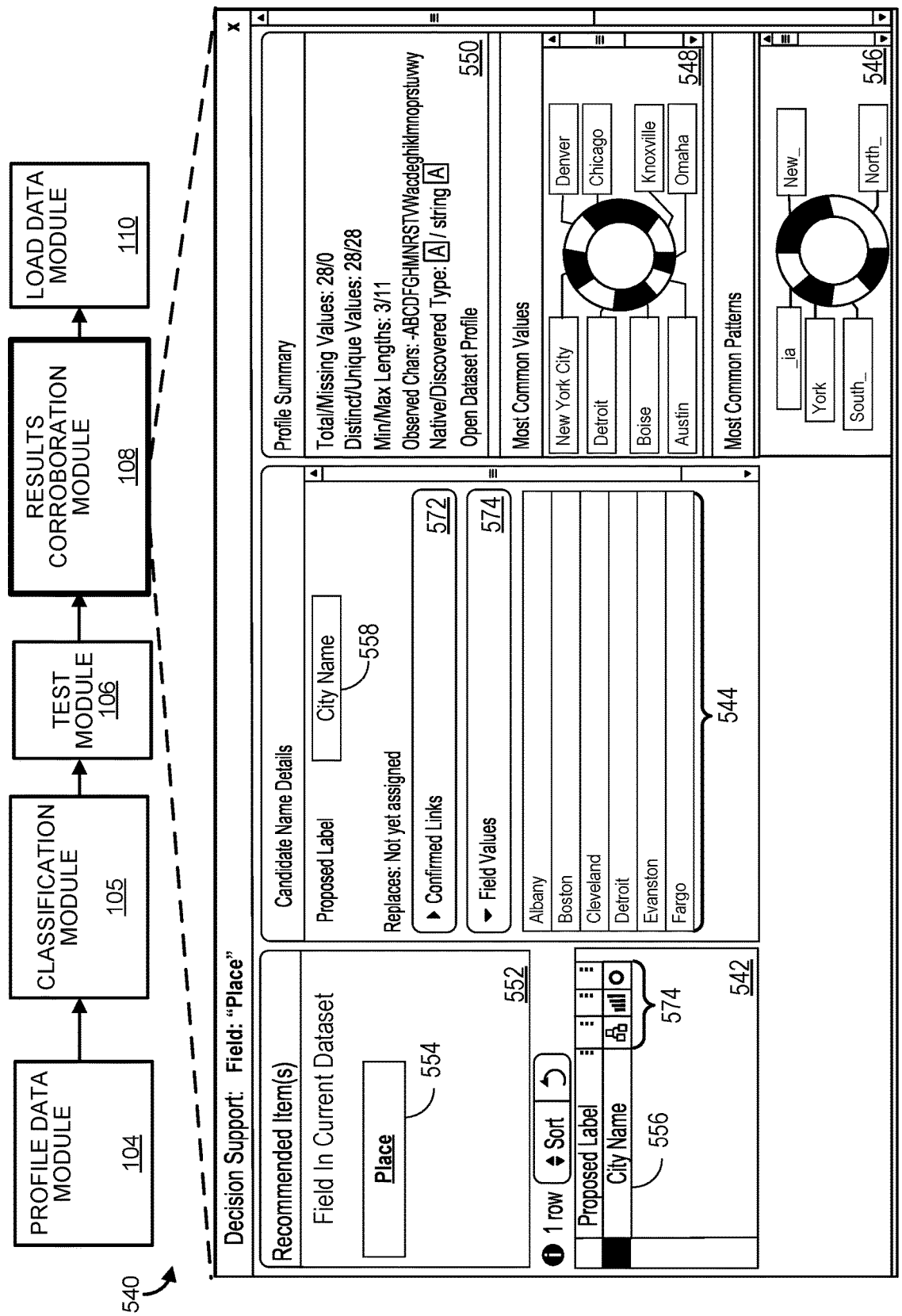
FIG. 6C is a depiction of a user interface showing recommendations for labels of discovered data fields.

FIG. 6C is a depiction of a user interface 540 showing an example of the results of the results corroboration module 108. The user interface 540 includes a proposed labels pane 542 in which labels that are likely to represent data fields are shown. A window 552 shows which fields are discovered in the analysis as received by the results corroboration module 108. The discovered field 554 has a name of "Place," which is included in the profile data of FIG. 6A and analyzed as described in relation to FIG. 6B. A proposed label 556 having a value of "City Name" is recommended to the user as a label for a field "Place."

The recommended item information pane 544 includes data describing the discovered field for which the label is recommended. For example, the current label(s) 558 assigned to the field can be shown. In this example, the field is not yet labeled (possibly, user input is pending). The values of entries in the data field can be shown in pane 574. Links among fields can be shown in menu 572. In this example, values including "Albany," "Boston," "Cleveland," "Detroit," "Evanston," and "Fargo" are shown.

The profile summary pane 550 shows summary of the contents of the field. For example, the summary pane 550 can include statistical data about the field, such as total values, missing values, a number of distinct/unique values, minimum and maximum lengths of the entries, the characters included in the entries, the data type(s) of the entries, and so forth. In this example, the field to be labeled "genre" has 28 values, with 28 unique values. All values are between 3 and 11 characters long, and all are string type. These clues can be used by the testing module 106 to determine that the label "genre" should be recommended, in addition to the data of the entries.

The common values pane 548 shows which values are most common in the field and their relative proportion of the values of the field. In this example, all different values of the field occur a similar number of times.

The patterns pane 546 shows common patterns for each of the entries of the field. For example, if a date were present, the pattern might include ##/##/####, as described above. Here, there is no particular pattern which dominates the field, though values including a pattern of "New_" are the most common. While these particular profile data are shown in panes 550, 548, 546, any data can be shown which can assist a user in approving a proposed candidate name for the discovered field.

Figure 6D:
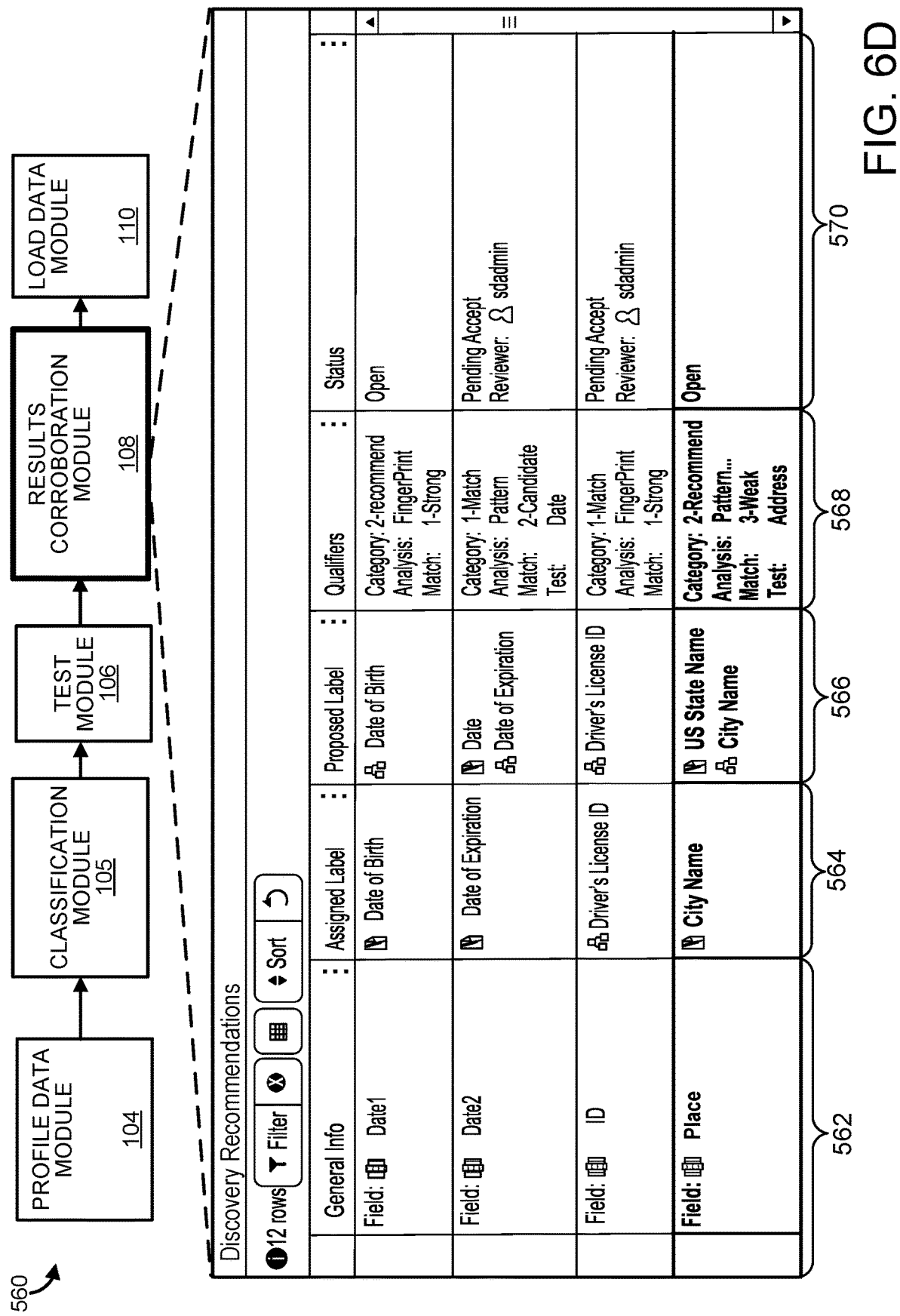
FIG. 6D is a depiction of a user interface showing an example of results of labeling the data fields.

Turning to FIG. 6D, a depiction of a user interface 560 showing recommendations for labels of discovered data fields. The user interface is presented in a tabular format in which values of the table are interactive. Column 562 shows field names received in the source data. Column 564 shows which labels have been assigned to the field. As described previously, each field can be associated with more than one label. Column 566 shows a proposed label for the field of column 562. Column 568 identifies which test(s) were run by the testing module 106 on the field, how strong the results are, and what category of recommendation is made for the label. Column 570 shows and pending decisions for the user with respect to the field of column 562. For example, the user might be prompted to accept/reject a proposed label, rerun a test with updated parameters, and so forth.

In this example, in the final row, the discovered field "Date1," which has been discovered, profiled, classified, and labeled as described in relation to FIGS. 6A-6C, is shown. The field "Date1" is assigned a label of "Date of Birth." As shown in column 568, the category of the label is the "recommend" category, as the score associated with the candidate label is 95, as shown in FIG. 6B. The analysis performed included pattern matching in addition to other analyses. The decision to assign a label to the field "Date1" is open, as a label has been assigned and no further action is needed by the user.

Figure 7:
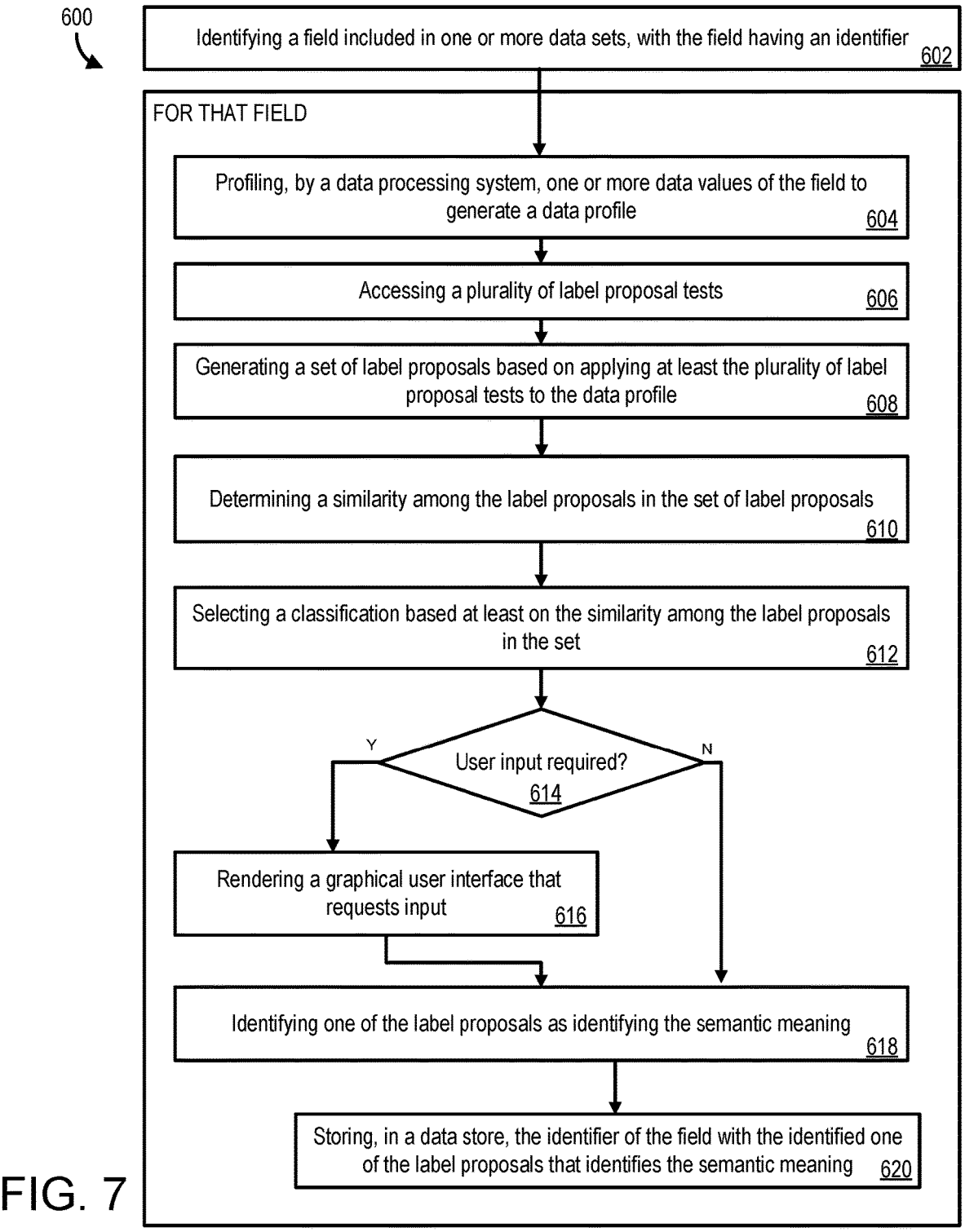
FIG. 7 is a flow diagram showing example processes for discovering, classifying and labeling data fields by analyzing a data profile generated from data of the data fields.

FIG. 7 shows a flow diagram of the process 600 for labeling discovered fields with candidate labels. The process 600 includes identifying (602) a field included in one or more data sets, with the field having an identifier. The process 600 includes, profiling (604), by a data processing system, one or more data values of the field to generate a data profile. The process 600 includes accessing (606) a plurality of label proposal tests. The process 600 includes generating (608) a set of label proposals based on applying at least the plurality of label proposal tests to the data profile. The process 600 includes determining (610) a similarity among the label proposals in the set of label proposals. The process 600 includes selecting (612) a classification based at least on the similarity among the label proposals in the set. The process 600 includes determining (614) if user input is required. The process 600 includes rendering (616) a graphical user interface that requests input if user input is required. The process 600 includes identifying (618) one of the label proposals as identifying the semantic meaning. The process includes storing (620), in a data store, the identifier of the field with the identified one of the label proposals that identifies the semantic meaning.

The techniques described above can be implemented using software for execution on a computer. For instance, the software forms procedures in one or more computer programs that execute on one or more programmed or programmable computer systems (which can be of various architectures such as distributed, client/server, or grid) each including at least one processor, at least one data storage system (including volatile and non-volatile memory and/or storage elements), at least one input device or port, and at least one output device or port. The software can form one or more modules of a larger program, for example, that provides other services related to the design and configuration of charts and flowcharts. The nodes, links and elements of the chart can be implemented as data structures stored in a computer readable medium or other organized data conforming to a data model stored in a data repository.

The techniques described herein can be implemented in digital electronic circuitry, or in computer hardware, firmware, software, or in combinations thereof. An apparatus can be implemented in a computer program product tangibly embodied or stored in a machine-readable storage device (e.g., a non-transitory machine-readable storage device, a machine-readable hardware storage device, and so forth) for execution by a programmable processor; and method actions can be performed by a programmable processor executing a program of instructions to perform functions by operating on input data and generating output. The embodiments described herein, and other embodiments of the claims and the techniques described herein, can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired; and in any case, the language can be a compiled or interpreted language.

Processors suitable for the execution of a computer program include, by way of example, both general and special purpose microprocessors, and any one or more processors of any kind of digital computer. Generally, a processor will receive instructions and data from a read-only memory or a random-access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Computer readable media for embodying computer program instructions and data include all forms of non-volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in special purpose logic circuitry. Any of the foregoing can be supplemented by, or incorporated in, ASICs (application-specific integrated circuits).

To provide for interaction with a user, embodiments can be implemented on a computer having a display device, e.g., a LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments can be implemented in a computing system that includes a back end component, e.g., as a data server, or that includes a middleware component, e.g., an application server, or that includes a front end component, e.g., a client computer having a graphical user interface or a Web browser through which a user can interact with an implementation of embodiments, or any combination of such back end, middleware, or front end components. The components of the system can be interconnected by any form or medium of digital data communication, e.g., a communication network. Examples of communication networks include a local area network (LAN) and a wide area network (WAN), e.g., the Internet.

The system and method or parts thereof may use the "World Wide Web" (Web or WWW), which is that collection of servers on the Internet that utilize the Hypertext Transfer Protocol (HTTP). HTTP is a known application protocol that provides users access to resources, which may be information in different formats such as text, graphics, images, sound, video, Hypertext Markup Language (HTML), as well as programs. Upon specification of a link by the user, the client computer makes a TCP/IP request to a Web server and receives information, which may be another Web page that is formatted according to HTML. Users can also access other pages on the same or other servers by following instructions on the screen, entering certain data, or clicking on selected icons. It should also be noted that any type of selection device known to those skilled in the art, such as check boxes, drop-down boxes, and the like, may be used for embodiments using web pages to allow a user to select options for a given component. Servers run on a variety of platforms, including UNIX machines, although other platforms, such as Windows 2000/2003, Windows NT, Sun, Linux, and Macintosh may also be used. Computer users can view information available on servers or networks on the Web through the use of browsing software, such as Firefox, Netscape Navigator, Microsoft Internet Explorer, or Mosaic browsers. The computing system can include clients and servers. A client and server are generally remote from each other and typically interact through a communication network. The relationship of client and server arises by virtue of computer programs running on the respective computers and having a client-server relationship to each other.

Other embodiments are within the scope and spirit of the description and the claims. For example, due to the nature of software, functions described above can be implemented using software, hardware, firmware, hardwiring, or combinations of any of these. Features implementing functions may also be physically located at various positions, including being distributed such that portions of functions are implemented at different physical locations. The use of the term "a" herein and throughout the application is not used in a limiting manner and therefore is not meant to exclude a multiple meaning or a "one or more" meaning for the term "a." Additionally, to the extent priority is claimed to a provisional patent application, it should be understood that the provisional patent application is not limiting but includes examples of how the techniques described herein may be implemented.

A number of embodiments of the invention have been described. Nevertheless, it will be understood by one of ordinary skill in the art that various modifications may be made without departing from the spirit and scope of the claims and the techniques described herein.

What is claimed is:

1. A method implemented by a data processing system for discovering a semantic meaning of data values of a field included in one or more data sets, the method including:
    identifying a field included in one or more data sets, the field being associated with an identifier;
    identifying a plurality of data values of the field, with at least a first one of the data values being distinct from a second one of the data values;
    based on the plurality of data values of the field, determining one or more attributes of the data values of the field;
    accessing a plurality of tests, wherein a test specifies a candidate semantic meaning for one or more given attributes;
    wherein a semantic meaning indicates what kind of data values are included in a given field;
    based on results of applying at least the plurality of tests to the determined one or more attributes for the field, specifying one or more candidate semantic meanings of the one or more data values of the field;

performing an analysis based on at least a candidate semantic meaning specified by a result of one of the tests and another candidate semantic meaning specified by a result of another one of the tests;

based on one or more results of the analysis, identifying one of the candidate semantic meanings as identifying the semantic meaning of the one or more data values of the field; and storing, in a data store, the identifier of the field with the identified semantic meaning of the one or more data values of the field.

2. The method of claim 1, wherein performing the analysis includes inputting data representing the candidate semantic meaning specified by the result of the one of the tests and data representing the candidate semantic meaning specified by the result of the other one of the tests into a data model; and outputting, from the data model, the identified semantic meaning of the one or more data values of the field.

3. The method of claim 1, wherein performing the analysis includes comparing the candidate semantic meaning specified by the result of one of the tests to the other candidate semantic meaning specified by the result of the other one of the tests.

4. The method of claim 2, including applying one or more weights to one or more items of the input data in identifying the semantic meaning.

5. The method of claim 2, further including assigning a weight with a higher value to the candidate semantic meaning specified by the result of the one of the tests than a value of a weight assigned to the candidate semantic meaning specified by the result of the other one of the tests.

6. The method of claim 1, including profiling the one or more data values of the field.

7. The method of claim 1, further including:
determining that the field includes a primary key for a data set of the one or more data sets; and
selecting a test of the plurality of tests that is related to the primary key.

8. The method of claim 1, wherein applying the plurality of tests includes:
performing a metadata comparison of data values of the field to terms in a glossary of terms.

9. The method of claim 1, further including:
determining, from a data profile, a pattern represented by the data values stored in the field;
determining a particular semantic meaning that is mapped to the pattern; and
labeling the field with the particular semantic meaning.

10. The method of claim 1, wherein applying the plurality of tests includes:
retrieving a list of values that are representative of a data collection;
comparing the data values of the field to the list of values;
determining, in response to the comparing, that a threshold number of the data values matches the values of the list; and
in response to the determining, labeling the field with a particular semantic meaning representing the data collection.

11. The method of claim 1, wherein the plurality of tests are each associated with at least one weight value, the method further including:
updating a weight value associated with at least one test; and
reapplying the test using the updated weight value.

12. The method of claim 1, including:
applying a score value to each candidate semantic meaning; and
ranking candidate semantic meanings according to the score value associated with each candidate semantic meaning.

13. A data processing system for discovering a semantic meaning of data values of a field included in one or more data sets, the system including:
a data storage storing instructions; and
at least one processor configured to execute the instructions stored by the data storage to perform operations including:
identifying a field included in one or more data sets, with the field being associated with an identifier;
identifying a plurality of data values of the field, with at least a first one of the data values being distinct from a second one of the data values;
based on the plurality of data values of the field, determining one or more attributes of the data values of the field;
accessing a plurality of tests, wherein a test specifies a candidate semantic meaning for one or more given attributes;
wherein a semantic meaning indicates what kind of data values are included in a given field;
based on results of applying at least the plurality of tests to the determined one or more attributes for the field, specifying one or more candidate semantic meanings of the one or more data values of the field;
performing an analysis based on at least a candidate semantic meaning specified by a result of one of the tests and another candidate semantic meaning specified by a result of another one of the tests;
based on one or more results of the analysis, identifying one of the candidate semantic meanings as identifying the semantic meaning of the one or more data values of the field; and
storing, in a data store, the identifier of the field with the identified semantic meaning of the one or more data values of the field.

14. The data processing system of claim 13, wherein performing the analysis includes inputting data representing the candidate semantic meaning specified by the result of the one of the tests and data representing the candidate semantic meaning specified by the result of the other one of the tests into a data model; and outputting, from the data model, the identified semantic meaning of the one or more data values of the field.

15. The data processing system of claim 13, wherein performing the analysis includes comparing the candidate semantic meaning specified by the result of one of the tests to the other candidate semantic meaning specified by the result of the other one of the tests.

16. The data processing system of claim 14, wherein the operations further include applying one or more weights to one or more items of the input data in identifying the semantic meaning.

17. The data processing system of claim 14, wherein the operations include assigning a weight with a higher value to the candidate semantic meaning specified by the result of the one of the tests than a value of a weight assigned to the candidate semantic meaning specified by the result of the other one of the tests.

18. The data processing system of claim 13, wherein the operations further include profiling the one or more data values of the field.

19. The data processing system of claim 13, wherein the operations further include:
   determining that the field includes a primary key for a data set of the one or more data sets; and
   selecting a test of the plurality of tests that is related to the primary key.

20. The data processing system of claim 13, wherein applying the plurality of tests includes:
   performing a metadata comparison of data values of the field to terms in a glossary of terms.

21. The data processing system of claim 13, wherein the operations further include:
   determining, from a data profile, a pattern represented by the data values stored in the field;
   determining a particular semantic meaning that is mapped to the pattern; and
   labeling the field with the particular semantic meaning.

22. The data processing system of claim 13, wherein applying the plurality of tests includes:
   retrieving a list of values that are representative of a data collection;
   comparing the data values of the field to the list of values;
   determining, in response to the comparing, that a threshold number of the data values match the values of the list; and
   in response to the determining, labeling the field with a particular semantic meaning representing the data collection.

23. The data processing system of claim 13, wherein the plurality of tests are each associated with at least one weight value, wherein the operations further include:
   updating a weight value associated with at least one test; and
   reapplying the test using the updated weight value.

24. The data processing system of claim 13, wherein the operations further include:
   applying a score value to each candidate semantic meaning; and
   ranking candidate semantic meanings according to the score value associated with each candidate semantic meaning.

25. One or more non-transitory computer readable media storing instructions for discovering a semantic meaning of data values of a field included in one or more data sets, the instructions being executable by one or more processors to perform operations including:
   identifying a field included in one or more data sets, with the field being associated with an identifier;
   identifying a plurality of data values of the field, with at least a first one of the data values being distinct from a second one of the data values;
   based on the plurality of data values of the field, determining one or more attributes of the data values of the field;
   accessing a plurality of tests, wherein a test specifies a candidate semantic meaning for one or more given attributes;
   wherein a semantic meaning indicates what kind of data values are included in a given field;
   based on results of applying at least the plurality of tests to the determined one or more attributes for the field, specifying one or more candidate semantic meanings of the one or more data values of the field;
   performing an analysis based on at least a candidate semantic meaning specified by a result of one of the tests and another candidate semantic meaning specified by a result of another one of the tests;
   based on one or more results of the analysis, identifying one of the candidate semantic meanings as identifying the semantic meaning of the one or more data values of the field; and
   storing, in a data store, the identifier of the field with the identified semantic meaning of the one or more data values of the field.

26. The one or more non-transitory computer readable media of claim 25, wherein performing the analysis includes inputting data representing the candidate semantic meaning specified by the result of the one of the tests and data representing the candidate semantic meaning specified by the result of the other one of the tests into a data model; and
   outputting, from the data model, the identified semantic meaning of the one or more data values of the field.

27. The one or more non-transitory computer readable media of claim 25, wherein performing the analysis includes comparing the candidate semantic meaning specified by the result of one of the tests to the other candidate semantic meaning specified by the result of the other one of the tests.

28. The one or more non-transitory computer readable media of claim 26, wherein the operations include applying one or more weights to one or more items of the input data in identifying the semantic meaning.

29. The one or more non-transitory computer readable media of claim 26, wherein the operations include assigning a weight with a higher value to the candidate semantic meaning specified by the result of the one of the tests than a value of a weight assigned to the candidate semantic meaning specified by the result of the other one of the tests.

30. The one or more non-transitory computer readable media of claim 25, wherein the operations include profiling the one or more data values of the field.

31. The one or more non-transitory computer readable media of claim 25, wherein the operations further include:
   determining that the field includes a primary key for a data set of the one or more data sets; and
   selecting a test of the plurality of tests that is related to the primary key.

32. The one or more non-transitory computer readable media of claim 25, wherein applying the plurality of tests includes:
   performing a metadata comparison of data values of the field to terms in a glossary of terms.

33. The one or more non-transitory computer readable media of claim 25, wherein the operations further include:
   determining, from a data profile, a pattern represented by the data values stored in the field;
   determining a particular semantic meaning that is mapped to the pattern; and
   labeling the field with the particular semantic meaning.

34. The one or more non-transitory computer readable media of claim 25, wherein applying the plurality of tests includes:
   retrieving a list of values that are representative of a data collection;
   comparing the data values of the field to the list of values;
   determining, in response to the comparing, that a threshold number of the data values match the values of the list; and
   in response to the determining, labeling the field with a particular semantic meaning representing the data collection.

35. The one or more non-transitory computer readable media of claim 25, wherein the plurality of tests are each associated with at least one weight value, wherein the operations further include:

updating a weight value associated with at least one test; and reapplying the test using the updated weight value.

36. The one or more non-transitory computer readable of claim 25, wherein the operations further include applying a score value to each candidate semantic meaning; and ranking candidate semantic meanings according to the score value associated with each candidate semantic meaning.

* * * * *

UNITED STATES PATENT AND TRADEMARK OFFICE
CERTIFICATE OF CORRECTION

PATENT NO. : 12,456,016 B2
APPLICATION NO. : 18/201545
DATED : October 28, 2025
INVENTOR(S) : Christopher Thurston Butler and Timothy Spencer Bush Page 1 of 1

It is certified that error appears in the above-identified patent and that said Letters Patent is hereby corrected as shown below:

In the Claims

Column 32, Lines 14-15, Claim 13, after "sets," delete "with"

Column 33, Line 47, Claim 25, after "sets," delete "with"

Signed and Sealed this
Sixth Day of January, 2026

John A. Squires
*Director of the United States Patent and Trademark Office*